United States Patent
Chrzanowski, Jr. et al.

(10) Patent No.: US 10,252,163 B2
(45) Date of Patent: Apr. 9, 2019

(54) MUSIC VIDEO GAME WITH USER DIRECTED SOUND GENERATION

(71) Applicant: Activision Publishing, Inc., Santa Monica, CA (US)

(72) Inventors: Michael J. Chrzanowski, Jr., East Greenbush, NY (US); Jonathan L. Hilliker, East Greenbush, NY (US); Robert L. Gallerani, Wynantskill, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 554 days.

(21) Appl. No.: 14/733,541

(22) Filed: Jun. 8, 2015

(65) Prior Publication Data
US 2015/0265930 A1    Sep. 24, 2015

Related U.S. Application Data

(62) Division of application No. 12/172,927, filed on Jul. 14, 2008, now Pat. No. 9,061,205.

(51) Int. Cl.
*G10H 3/00* (2006.01)
*A63F 13/54* (2014.01)
(Continued)

(52) U.S. Cl.
CPC .............. *A63F 13/54* (2014.09); *A63F 13/10* (2013.01); *A63F 13/21* (2014.09); *A63F 13/245* (2014.09); *A63F 13/428* (2014.09); *A63F 13/44* (2014.09); *A63F 13/5375* (2014.09); *A63F 13/814* (2014.09); *G10H 1/342* (2013.01);
(Continued)

(58) Field of Classification Search
CPC ....... G10H 2210/091; G10H 2220/145; G10H 2220/135; G10H 2220/395; G10H 2240/131; G10H 2220/391; G10H 2220/561

See application file for complete search history.

(56) References Cited

U.S. PATENT DOCUMENTS 4,336,734 A    6/1982    Polson
4,748,887 A    6/1988    Marshall
(Continued)

OTHER PUBLICATIONS

"Wii," Operations Manual System Setup, Nintendo of America Inc., 20 pages.
(Continued)

*Primary Examiner* — Marlon Fletcher
(74) *Attorney, Agent, or Firm* — Klein, O'Neill & Singh, LLP

(57) ABSTRACT

A music based video game provides a user directed sound generation feature. In some embodiments, the user is provided a video game controller simulating a musical instrument, which the user may operate similarly to its real musical instrument counterpart. A free play feature is provided for users to operate the video game controller, where a processor of a video game console receives input signals from the video game controller and outputs audio samples based on the received input signals. During the free play feature, multiple suggestions as to how to operate the video game controller are simultaneously provided to give users some guidance as to what to play using the video game controller.

6 Claims, 12 Drawing Sheets

(51) Int. Cl.
*A63F 13/44* (2014.01)
*A63F 13/428* (2014.01)
*A63F 13/245* (2014.01)
*A63F 13/40* (2014.01)
*G10H 1/34* (2006.01)
*G10H 1/36* (2006.01)
*G10H 1/38* (2006.01)
*A63F 13/21* (2014.01)
*A63F 13/5375* (2014.01)
*A63F 13/814* (2014.01)
*A63F 13/214* (2014.01)

(52) U.S. Cl.
CPC .............. *G10H 1/36* (2013.01); *G10H 1/386* (2013.01); *A63F 13/214* (2014.09); *A63F 2300/1006* (2013.01); *A63F 2300/1062* (2013.01); *A63F 2300/305* (2013.01); *A63F 2300/6018* (2013.01); *A63F 2300/6045* (2013.01); *A63F 2300/8047* (2013.01); *G10H 2210/091* (2013.01); *G10H 2220/096* (2013.01); *G10H 2220/135* (2013.01); *G10H 2220/395* (2013.01)

(56) References Cited

U.S. PATENT DOCUMENTS

| | | |
|---|---|---|
| 4,817,484 A | 4/1989 | Iba et al. |
| 4,901,618 A | 2/1990 | Blum, Jr. |
| 5,085,119 A | 2/1992 | Cole |
| 5,095,799 A | 3/1992 | Wallace et al. |
| 5,393,926 A | 2/1995 | Johnson |
| 5,516,105 A | 5/1996 | Eisenbrey et al. |
| 5,585,583 A | 12/1996 | Owen |
| 5,624,117 A | 4/1997 | Ohkubo et al. |
| 5,670,729 A | 9/1997 | Miller et al. |
| 5,690,496 A | 11/1997 | Kennedy |
| 5,726,374 A | 3/1998 | Vandervoort |
| 5,739,455 A | 4/1998 | Poon |
| 5,777,251 A | 7/1998 | Hotta et al. |
| 5,900,567 A | 5/1999 | Fay et al. |
| 5,920,024 A * | 7/1999 | Moore .................... G10H 1/00 356/28 |
| 6,225,547 B1 | 5/2001 | Toyama et al. |
| 6,249,274 B1 | 6/2001 | Svancarek et al. |
| 6,347,998 B1 | 2/2002 | Yoshitomi et al. |
| 6,390,923 B1 | 5/2002 | Yoshitomi et al. |
| 6,444,887 B1 | 9/2002 | Hiraoka et al. |
| 6,570,078 B2 | 5/2003 | Ludwig |
| 6,646,195 B1 | 11/2003 | Puryear |
| 6,852,919 B2 | 2/2005 | Ludwig |
| 6,860,813 B2 | 3/2005 | Kubo |
| 6,908,386 B2 | 6/2005 | Suzuki et al. |
| 6,921,332 B2 | 7/2005 | Fukunaga et al. |
| 7,019,205 B1 | 3/2006 | Fujisawa et al. |
| 7,320,643 B1* | 1/2008 | Brosius .................... A63F 13/06 463/37 |
| 7,351,152 B2 | 4/2008 | Abe et al. |
| 7,625,284 B2* | 12/2009 | Kay ........................ A63F 13/10 463/1 |
| 8,003,872 B2* | 8/2011 | Lopiccolo .............. G10H 1/342 463/43 |
| 8,017,857 B2 | 9/2011 | Chiu et al. |
| 2006/0058101 A1 | 3/2006 | Rigopulos |
| 2007/0232374 A1 | 10/2007 | Lopiccolo et al. |
| 2007/0234885 A1* | 10/2007 | Schmidt ................ G10H 1/342 84/722 |
| 2007/0243915 A1 | 10/2007 | Egozy et al. |
| 2007/0256541 A1 | 11/2007 | McCauley |
| 2009/0100988 A1* | 4/2009 | Villa ...................... A63F 13/00 84/601 |
| 2009/0188371 A1 | 7/2009 | Chiu et al. |
| 2009/0258700 A1* | 10/2009 | Bright .................... A63F 13/10 463/31 |
| 2010/0009746 A1* | 1/2010 | Raymond ............... A63F 13/24 463/31 |
| 2010/0009749 A1* | 1/2010 | Chrzanowski, Jr. .... A63F 13/10 463/35 |
| 2010/0300264 A1* | 12/2010 | Foster ................... G10H 1/0058 84/610 |
| 2010/0300265 A1* | 12/2010 | Foster ................... G10H 1/0016 84/610 |
| 2010/0300266 A1* | 12/2010 | Stoddard ................ G10H 1/368 84/610 |
| 2010/0300267 A1* | 12/2010 | Stoddard ................ G10H 1/368 84/610 |
| 2010/0300268 A1* | 12/2010 | Applewhite ........... G10H 1/368 84/610 |
| 2010/0300269 A1* | 12/2010 | Applewhite ......... G10H 1/0058 84/610 |
| 2010/0300270 A1* | 12/2010 | Applewhite ......... G10H 1/0058 84/610 |
| 2010/0304863 A1* | 12/2010 | Applewhite ........... G10H 1/368 463/36 |
| 2016/0093278 A1* | 3/2016 | Esparza ................. G10H 3/143 84/615 |
| 2017/0182405 A1* | 6/2017 | Holmes ................ A63F 13/211 |

OTHER PUBLICATIONS

"Shredmaster Jr." User's Guide, DreamGear, 2 pages.
Final Office Action on U.S. Appl. No. 11/418,374 dated Jul. 1, 2009.
U.S. Appl. No. 12/172,927, filed Jul. 14, 2008, Michael J. Chrzanowski, Jonathan L. Hilliker, Robert L. Gallerani, US 2010-0009749 A1, Office Action dated Nov. 28, 2011; Dec. 17, 2013, Final Office Action dated Jul. 23, 2012; Apr. 21, 2014, Notice of Allowance dated Feb. 20, 2015.

* cited by examiner

MUSIC VIDEO GAME WITH USER DIRECTED SOUND GENERATION

CROSS-REFERENCE TO RELATED APPLICATION

The present application is a continuation of U.S. patent application Ser. No. 12/172,927, filed Jul. 14, 2008, the disclosure of which is incorporated by reference herein.

BACKGROUND

The present invention relates generally to video games, and more particularly to a music based video game with a guitar shaped game controller.

Video games provide a source of entertainment for many. Different video games provide users with different interactive challenges, many of which simulate interesting situations and scenarios that users may not typically experience. Often, video game simulations are simplified but different versions of their real counterparts, and proficiency at the video games require practice using different types of skill sets. Video games may also provide venues for users to express their creativity in a variety of different ways.

Music based video games with simulated musical instruments are popular amongst some users. Such music based video games may allow users to play along with songs, for example by providing a predetermined sound file for use in providing audio responsive to video game play. Video game controllers used in conjunction with the music based video games may be designed in the general shape of different musical instruments, where operation of the video game controllers may simulate the operation of the musical instruments they resemble. Use of a video game controller in the general shape of a musical instrument may provide a user a more realistic experience as a musician. Video game controllers are also more versatile than real instruments, and may be utilized to generate a much wider range of audio samples than a conventional instrument.

Merely playing along with a song, for example that offers only a predetermined musical output however, may not fully simulate the musical experience, particularly the creative aspects of music creation. Experienced musicians may improvise notes, beats, vocals, chords, riffs and solos when playing music in a group setting, and inexperienced musicians or others may not comprehend or have the capability to do so in a harmonious manner. Many musicians do not merely play songs created by others, but also compose and create their own songs, as well as embellish the works of others. Creating a song, or any piece of music is often difficult, particularly for someone who may not be fully versed in music theory or application.

SUMMARY OF THE INVENTION

The invention provides a music based video game with user directed sound generation and, in some embodiments, local and remote group musical collaboration. In one aspect, the invention provides a method for generating audio samples within a song or style of musical accompaniment in a music based video game, comprising: determining an angular position of a video game controller; determining a status of a plurality of input devices of the video game controller; selecting an audio sample based on the angular position or other position and the status; and commanding an output of the selected audio sample.

In another aspect, the invention provides a method of complying with one of a plurality of suggested note sequences in a musical video game, comprising: presenting a plurality of sequences of suggested user inputs; receiving an input signal generated based on user operation of input devices on a video game controller, the input signal in compliance with a first suggested input of at least one of the plurality of sequences; determining compliance of subsequently received input signals from the video game controller with the at least one of the plurality of sequences; and replacing the at least one of the plurality of sequences with a new sequence of suggested user inputs.

In another aspect, the invention provides a system for providing a visual interface for recommending note, chord, beat or vocal sequences in a musical video game, comprising: a display; a guitar shaped video game controller including a body, a neck extending from the body, a strum input on the body, and a plurality of fret inputs on the neck; memory, the memory including display information of a plurality of cards, each card including suggested sequences of fret input combinations executable on the plurality of fret inputs on the video game controller; and a processor configured by program instructions to generate display information, the program instructions including instructions for: displaying at least two of the plurality of cards; receiving input signals generated by user operation of the video game controller, the input signals based on fret input combinations executed on the video game controller; determining successful compliance of the input signals with one card of the at least two cards; replacing the one card with another card of the plurality of cards.

In another aspect, the invention provides a method of generating a music compilation, comprising: receiving an indication of the video game controller positioned in a first of a plurality of angular regions, the angular regions based on physical orientation of the video game controller; receiving a first input signal from the video game controller; outputting an audio track based on the first input signal; receiving an indication of the video game controller entering a second of the plurality of angular regions; receiving a second input signal from the video game controller; and outputting an audio sample based on the second input signal, the audio sample outputted simultaneously with the audio track.

In another aspect, the invention provides a method of transitioning from a first section of a song to a second section of the song in a music based video game, comprising: providing a first plurality of suggested input sequences, the input sequences including suggested user operation of a video game controller, the first plurality of suggested input sequences suitable for the first section of the song; providing a transition input sequence; receiving input signals from the video game controller, the input signals compliant with the transition input sequence; replacing the first plurality of suggested input sequences with a second plurality of suggested input sequences, the second plurality of suggested input sequences suitable for the second section of the song.

In yet another aspect, the invention provides a method of generating audio tracks in a music video game, comprising: receiving a first input signal indicating operation of a first plurality of input devices; outputting a polyphonic audio compilation based on the first input signal, the polyphonic audio compilation including at least two audio tracks featuring different instruments; receiving a second input signal indicating operation of a second plurality of input devices;

selecting at least one of the at least two audio tracks based on the second input signal; and muting the at least one of the at least two audio tracks.

These and other aspects of the invention are more fully comprehended upon review of the disclosure.

DETAILED DESCRIPTION

Figure 1:
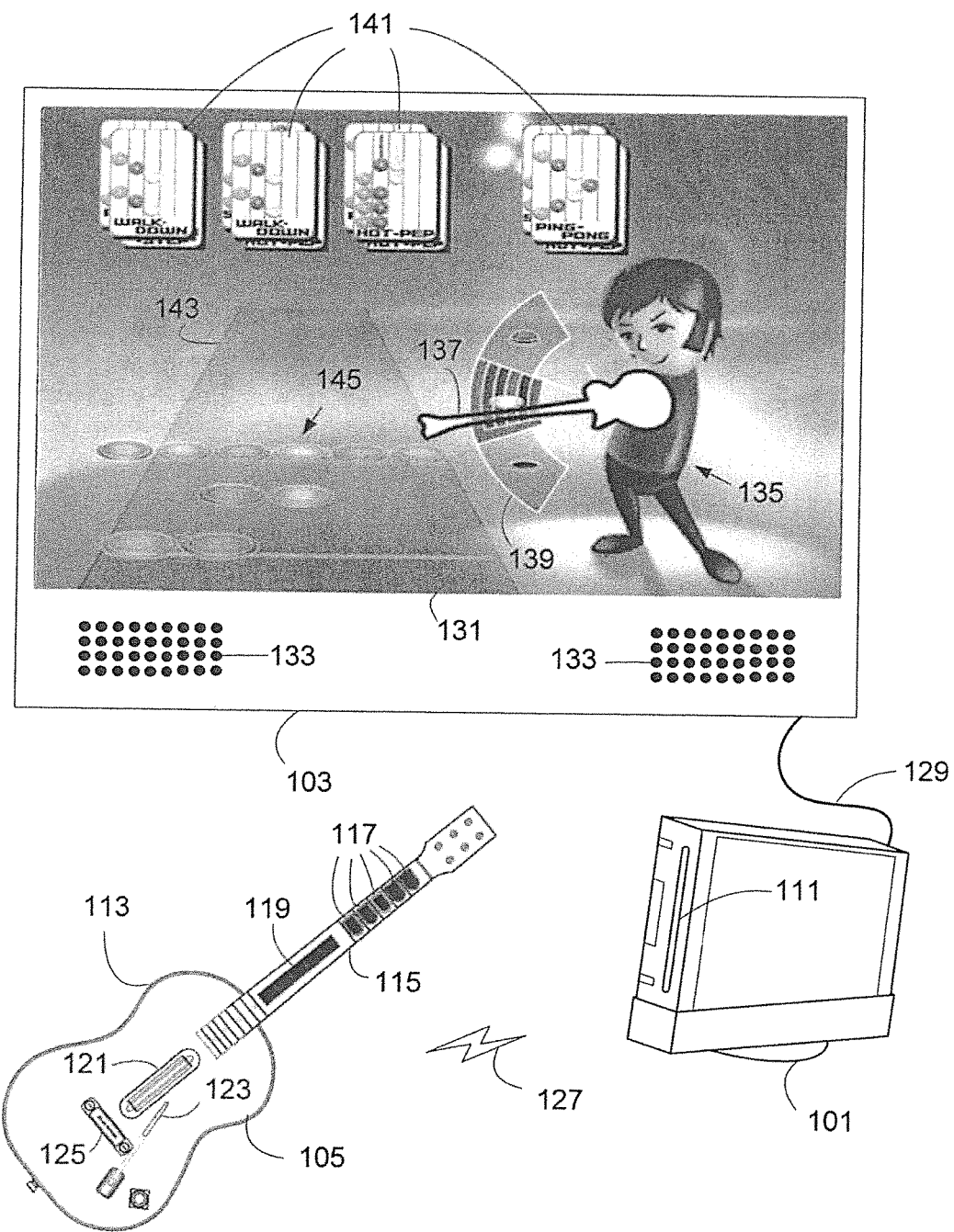
FIG. 1 is an example of a video game system in accordance with aspects of the invention.

FIG. 1 is an example of a video game system in accordance with aspects of the invention. The video game system includes a video game console 101, a display 103, and a guitar shaped video game controller 105. The video game console includes internal circuitry which allows the console to run a video game by executing various program instructions related to proper execution of the video game. The video game console typically includes one or more processors, memory, and various interface circuitry for running a video game. The instructions for each specific video game are generally found on a removable memory source such as a video game CD-ROM, inserted into a removable memory interface 111 of the video game console. In some embodiments of the invention, the video game console may alternatively be a handheld gaming device, including similar internal circuitry as herein described, as well as, for example, a built in display or displays and various different user input devices.

The video game console may communicate with one or more video game controllers to properly run the video game. The video game controller in the embodiment of FIG. 1 is a guitar shaped video game controller, and includes a guitar body 113 with a neck 115 extending from the body. The guitar neck includes a plurality of fret buttons 117 and an analog slider input 119, while the body includes a strum bar 121, a tremolo arm 123, and a palm mute button 125. In various embodiments additional input devices may also be provided. The guitar shaped video game controller may be used, for example, to play a rhythm based music video game. In other embodiments of the invention, video game controllers with different configurations may be utilized depending on the format of each individual video game. For example, an embodiment of the invention may include a video game controller simulating a drum set, with the video game console configured to generate drum audio samples, or other samples, and display a user interface with more drum related information. Likewise, an embodiment of the invention may include a microphone, with tilt or position sensing in some embodiments, with the video game console configured to process inputs from the microphone, and provide vocal effects or generate instrument sounds based on the pitch or rhythm of the user's voice and in some embodiments position or orientation of the microphone.

Generally, a user of the video game system operates the video game controller to generate user input signals, which are sent to the video game console. In music video games using video game controllers fashioned after musical instruments, for example, the guitar shaped video game controller of FIG. 1, operation of the video game controller may mimic or simulate the operation of the video game controller's real instrument counterpart. For the aforementioned guitar shaped video game controller, a user may simulate different guitar chord fingerings through operation of the fret buttons, for example, different fret fingering combinations, and may simulate a strum of a guitar through an upward or downward deflection of the strum bar. Control circuitry within the guitar shaped video game controller may generate input signals based on the user operation of these input devices on the video game controller as well as the operation of various other different input devices on the video game controller.

Input signals generated by the video game controller may include information on fret combinations a user performs on the video game controller when the strum input is actuated. In some embodiments of the invention, alternative ways of generating input signal combinations through the video game controller are also possible, for example, touching the analog slide input without a strum actuation, or for example, knocking on the body of the video game controller with the user's hand. Often, the video game controller is operated in response to video game instructions provided by the video game console to the user. Input signals generated by the video game controller are processed by the video game console to personalize video game play based on the user's unique operation of the video game controller. In the embodiment of FIG. 1, the input signals are sent to the video game console through a wireless connection 127, but in some embodiments, the video game console and video game controller may be connected via a wired connection. In embodiments of the invention, the input signals are generally processed by the video game console to generate audio outputs associated with video game play. For example, the console may use input signals received from a guitar shaped video game controller to generate various guitar based audio samples.

In some embodiments, the available inputs on a guitar shaped video game controller may also be used to generate other possible sounds in the music video game. For example, in some embodiments, different input signals from the guitar shaped video game controller may be processed and mapped by the video game console into drum output sounds, drum beats, vocal outputs, DJ or keyboard output sounds. In this fashion, users of the video game may generate sounds based on various different instruments using the guitar shaped video game controller.

The video game console is also in communication with a display unit, generally through an audio-video cable 129 or similar wired connection. The display unit is typically a television, with a display screen 131 and at least one audio output device, such as a speaker 133. In the embodiment of FIG. 1, the display screen shows a screen shot of a video game play interface in a music video game. The game play interface is presented while the video game is performing user directed sound generation, that is, a free play option which allows users of the music video game to simulate music creation through operation of the guitar shaped video game controller in place of a real guitar. Some embodiments of the invention include a video game controller with an accelerometer, an infrared sensor, magnetic position or similar position or motion sensors, to determine a vertical tilt level of the video game controller. The game play interface includes a tilt indicator 135 indicating a current tilt level 137 of the guitar shaped video game controller, and one of a number of tilt regions 139 in which the video game controller is currently located. In some embodiments of the invention, the tilt region n which the video game controller is positioned affects the processing by the video game console of input signals received from the video game controller. The game play interface also includes multiple cards or visual displays 141 displaying different note sequence suggestions for players to follow in case the users desire recommendations as to how to operate the video game controller. The note sequence suggestions include a number of different recommended fret input sequences the user may perform on the video game controller. However, in embodiments of the invention, game play and advancing in the video game are not predicated on compliance with any of the presented note sequences. The video game console may process the input sequences into audio outputs which fit into the context of a current audio track being played in the background of the video game. Various alternative note recommendations or instructions may also be incorporated into the video game, such as for example, different sequences of visualized notes arranged onto multiple music tracks. The game play interface also includes a scrolling music track 143, which in some embodiments, may display recent fret, vocal, keyboard, drum or other instrument input combinations, for example, combination 145, performed on the video game controller by the user. The fret combinations may be visualized by, for example, gems representative of recently activated inputs or some subset of those inputs. Furthermore, the scrolling music track may also include relevant tilt information, for example, different shaped gems or gems raised different distances from a surface of the music track, to indicate a particular angular configuration at which each fret combination was performed. Embodiments of the invention including a tilt feature may also include note recommendations including suggested operation of the tilt feature. In some embodiments information of user video game play for a sequence of cards is retained, and then displayed on a note highway as user instructions for another user. If, for example, the other user successfully complies with the user instructions, the other user may engage in video game play for a further sequence of cards, with information of the other user game play for the further sequence of cards retained, and then displayed on the note highway as user instructions for the first user. Extent user compliance may be used to provide a score for each user, and, in some embodiments, such game play may continue until a user is unable to comply with a set of user instructions.

Figure 2:
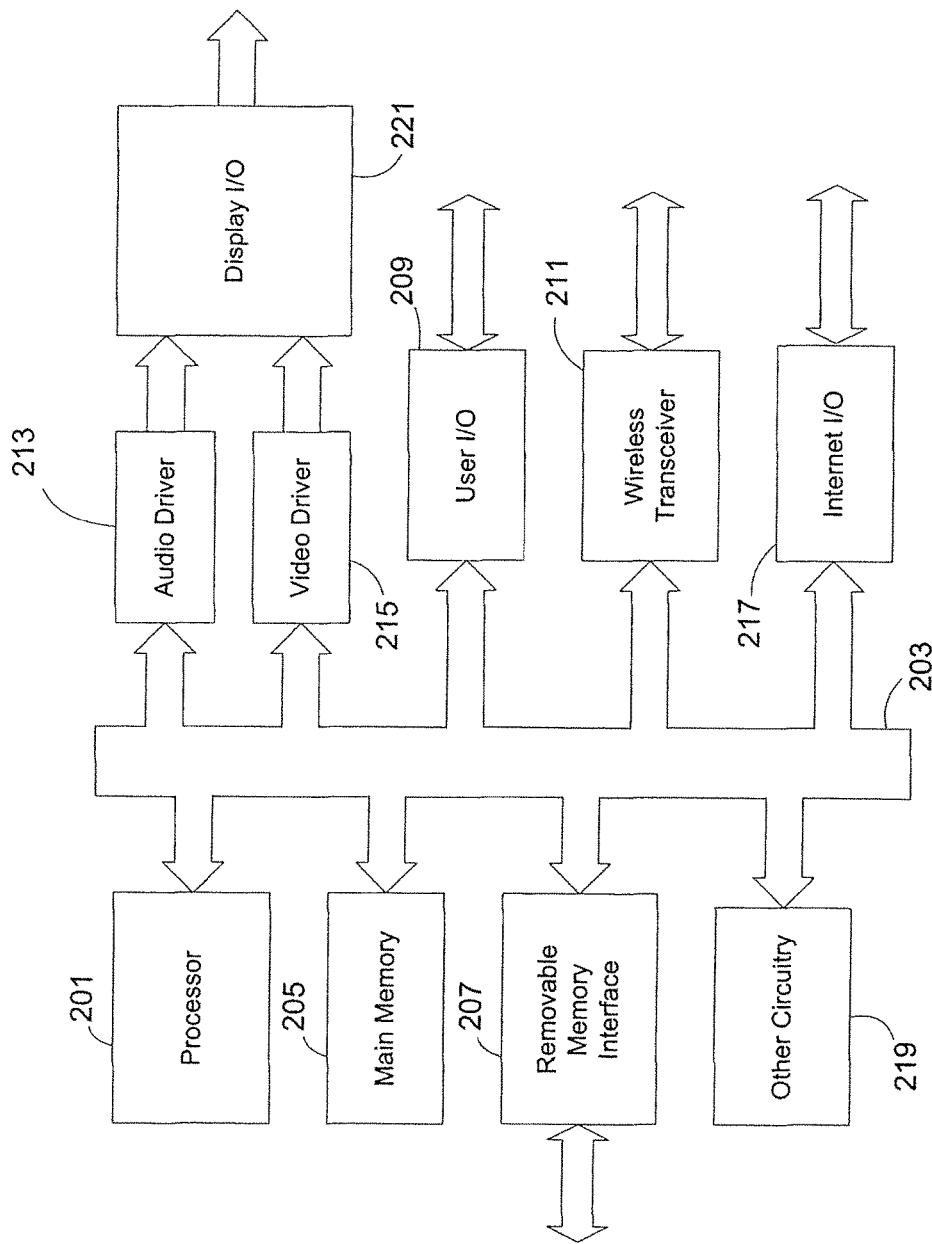
FIG. 2 is an example of a block diagram of a video game console processing unit in accordance with aspects of the invention.

FIG. 2 is an example of a block diagram of a video game console processing unit in accordance with aspects of the invention. In the embodiment of FIG. 2, the processing unit includes at least one processor 201 interconnected with other components via a system bus 203. The other components may include, for example, a main memory 205 of the video game console, a removable memory interface 207, a user input/output port 209, a wireless transceiver 211, an audio driver 213, a video driver 215, an Internet input/output port 217, and other circuitry 219, which may include for example an infrared sensor. In other embodiments of the invention, there may be different combinations of components that make up a video game console processing unit, depending on the individual needs of each application.

The processor executes various types of software instructions to facilitate video game play of for example, the music based video game described with respect to FIG. 1. The processor may use the components of the processing unit in order to execute the software instructions. The processor may retrieve video game instructions for a specific video game from a removable memory source, for example, a video game CD-ROM, inserted into the removable memory interface of the video game console. The processor may process the video game instructions in accordance with console specific program instructions, which are generally found in the main memory of the video game console. The processor also receives user input signals from a connected video game controller, either through the user input/output port or the wireless transceiver. The processor processes the various instructions and received input signals to generate audio and video output signals representative of video game play.

The processor may also be in data communication with a display unit, which outputs audio and video outputs of video game action to a user of the system. The processor may send audio generation information to the audio driver, and video generation information to the video driver, each of which generates audio and video output signals, respectively, from the received generation information. The audio and video drivers forward the audio and video output signals through a combined display input/output port 221, or alternatively, separate audio and video input/output ports, to the display unit.

In some embodiments, the processor is also connected to the Internet via either the Internet input/output port, or via the wireless transceiver. A connection to the Internet may be used to facilitate multiplayer game play with other users in remote locations if a multiplayer option is provided by a particular video game. In some embodiments, an Internet connection may also be used by video game companies to offer, for free or for sale, various downloadable content associated with a particular game. In the music based video game of FIG. 1, downloadable content may include, for example, different characters, lessons, otherwise unavailable note suggestion cards, and new songs or background audio tracks. In other embodiments, the invention may provide for creation of note suggestion cards, and the Internet connection may facilitate sharing or trading of user created cards between users in remote locations.

Figure 3:
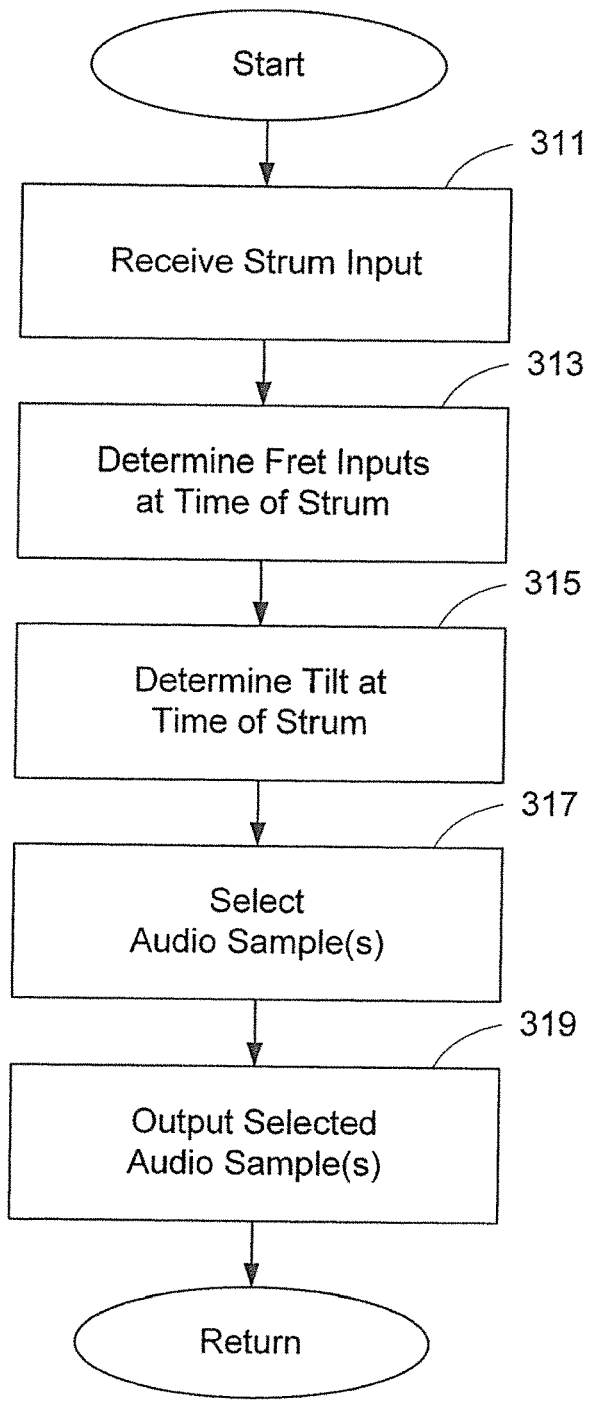
FIG. 3 is a flow diagram of a process of determining an audio output in accordance with aspects of the invention.

FIG. 3 is a flow diagram of a process of determining an audio output in accordance with aspects of the invention. In most embodiments the process is performed by a video game console, such as the video game console of FIG. 1, on a processor, for example the processor of FIG. 2. In some embodiments a video game controller, for example, the guitar shaped video game controller described with respect to FIG. 1, generates input signals based on the manner in which the video game controller is operated. A processor of the video game console receives the input signals from the video game controller, and processes the input signals to generate audio, and in some embodiments video, outputs. In musical video games, for example as have been described, the audio outputs may be in the form of audio samples recorded from real guitars, other instruments, for example, bass guitars, drum sets, or pianos or keyboards, or other sound generators, with or without effects processing. In some embodiments, the audio samples may be, for example, synthesized audio samples under the Musical Instrument Digital Interface, or MIDI, protocol. In these embodiments, audio samples for any of a wide range of instruments may be assigned to different input signals generable from the video game controller. Therefore, a guitar shaped video game controller, such as the one described with respect to FIG. 1, may be operated to generate not only guitar audio samples, but may be easily configured to generate audio samples from drum sets and other types of instruments through the video game console as well. In the embodiment of FIG. 3, the video game controller includes at least a strum input, a plurality of fret inputs, and a position detection device, for example, an accelerometer.

In block 311, the process receives a strum input signal from the guitar shaped video game controller. A strum input signal may be generated when a simulated strum is performed on the video game controller. A strum may be performed by, for example an upward or downward deflection of the strum input device, simulating a strumming of the strings on a real guitar. In some embodiments, strum input signals may also include other information, for example, information of the direction of the strum, the average speed of a series of consecutive strums, or for example, information of the strength of a strumming action or other actuations of inputs. A processor receives the strum input signal and may determine, for example, the timing of an audio output based on the timing information of the strum. In embodiments where the strum input signal includes additional information, the processor of the video game console may adjust certain audio output properties, for example, volume or magnitude of output, based in part on the additional information included in the strum input signal.

In block 313, the process determines a status of each of the plurality of fret inputs of the video game controller at the time the strum input was activated. The fret inputs are located on the neck of the video game controller, and operation of the fret inputs simulates chord fingerings performed on the strings of a real guitar. In an exemplary embodiment of the invention, the guitar shaped video game controller provides five fret input buttons. Additionally, five touch sensitive buttons may be provided in some embodiments. Generally, video game instructions determine the mapping of audio samples to particular combinations of activated fret input buttons, much like different string fingerings and motions may produce different notes on a real guitar. In some embodiments, users may also adjust configuration settings associated with the video game to change the associations between audio samples and fret combinations.

Some embodiments of the invention may also include additional input devices on the video game controller, for example, the analog touch pad input or the palm mute button described with respect to the video game controller of FIG. 1, or peripheral devices, for example, a foot pedal connected to the video game controller. Some embodiments may also determine a status of each of these additional input devices. Video game instructions may include information on mapping various audio samples to input signals generable by the additional input devices. In some embodiments, video game instructions may alternatively include information on alternate audio sample mappings for different executed fret combinations when one or more of the additional input devices is simultaneously depressed or activated.

In block 315, the process determines a tilt region of the video game controller at the time the strum input was activated. In embodiments of the invention, the video game controller includes an accelerometer or similar position or motion detection device, such as an infrared or similar sensor. The accelerometer or other motion detection device provides information on an orientation, which may be considered angular configuration or positioning of the video game controller, for example, a vertical angle at which the video game controller is tilted or held. Angular or tilt position of the video game controller may be determined based on the angle an axis of extension of the neck makes with a horizontal reference, for example, the ground. A plurality of angular tilt regions are predefined by the video game. An exemplary embodiment of the invention includes three tilt regions, but other embodiments of the invention may include more or less than three tilt regions. A tilt region is determined to be active if the angular position of the video game controller falls within the tilt region. In some embodiments, the tilt region is determined by a control unit in the video game controller, and an input signal sent to the video game console may include information of the active tilt region. In other embodiments, input signals may include information on angular or tilt position, and the processor of the video game console may use the input signal to determine the active tilt region. Depending on the application, some embodiments may employ the accelerometer in a variety of different ways, for example, determining horizontal positioning of a video game controller, or for example, determining a speed at which the video game controller shifts from a first position to a second position.

In block 317, the process selects a note audio sample, a chord audio sample, or a sequence of audio samples to output. In some embodiments of the invention, the tilt region determines the type of audio outputs selected. For example, in embodiments with three tilt regions, the processor of the video game console may determine whether to output either notes, chords, or sequences of notes and/or chords based on the tilt region active at the time of strum or other user operation of a video game controller. The different fret combinations in a first tilt region may be designated for single notes, the fret combinations in a second tilt region to chords, and the fret combinations in a third tilt region to note or chord sequences. The processor of the video game console selects an audio output based on information collected from the strum input signal, the fret input signals, and the tilt region input signal. In this fashion, each fret combination may be processed by the video game console to output one of three different audio samples, based on the active tilt region.

In block 319, the process outputs the selected audio sample or samples, whether it is a note, a chord, or an audio sample sequence. A processor of the video game console may send audio generation information to for example, an audio driver, which in turn may generate the selected audio sample or samples to be output by a speaker or similar audio output device. After the selected audio sample or samples are output, the process returns.

In some embodiments, particular notes and chords may be generated independent of the process of FIG. 3. For example, in some embodiments, in addition to the ret buttons, an analog input device may also be available on the neck of the video game controller. In these embodiments, the processor may generate outputs based solely on input signals generated by the analog input, independent of a strum input signal. Therefore, some outputs or modified audio samples may be generated when the processor receives input signals indicating only tapping, holding or sliding a finger or similar actuator along the analog input. In some embodiments, an accelerometer of the video game controller may also be configured to detect vibrations or quick jolts applied to the video game controller. In these embodiments, an input signal may be generated by the video game controller when, for example, the user knocks on the body of the video game controller with his hand. The processor of the video game controller may process this type of input signal, and generate an output audio sample of a percussive knock or pyrotechnic sound in response. Other embodiments of the invention may include various different types of input-output mappings which either expand on or deviate from the process presented in FIG. 3. In other embodiments, one or more additional input buttons or devices may be found on the video game controller, for example, a tremolo arm, or an auxiliary or palm mute button. The additional input devices may be used to generate input signals which the video game console processes to, for example, determine alternative audio outputs.

Figure 4:
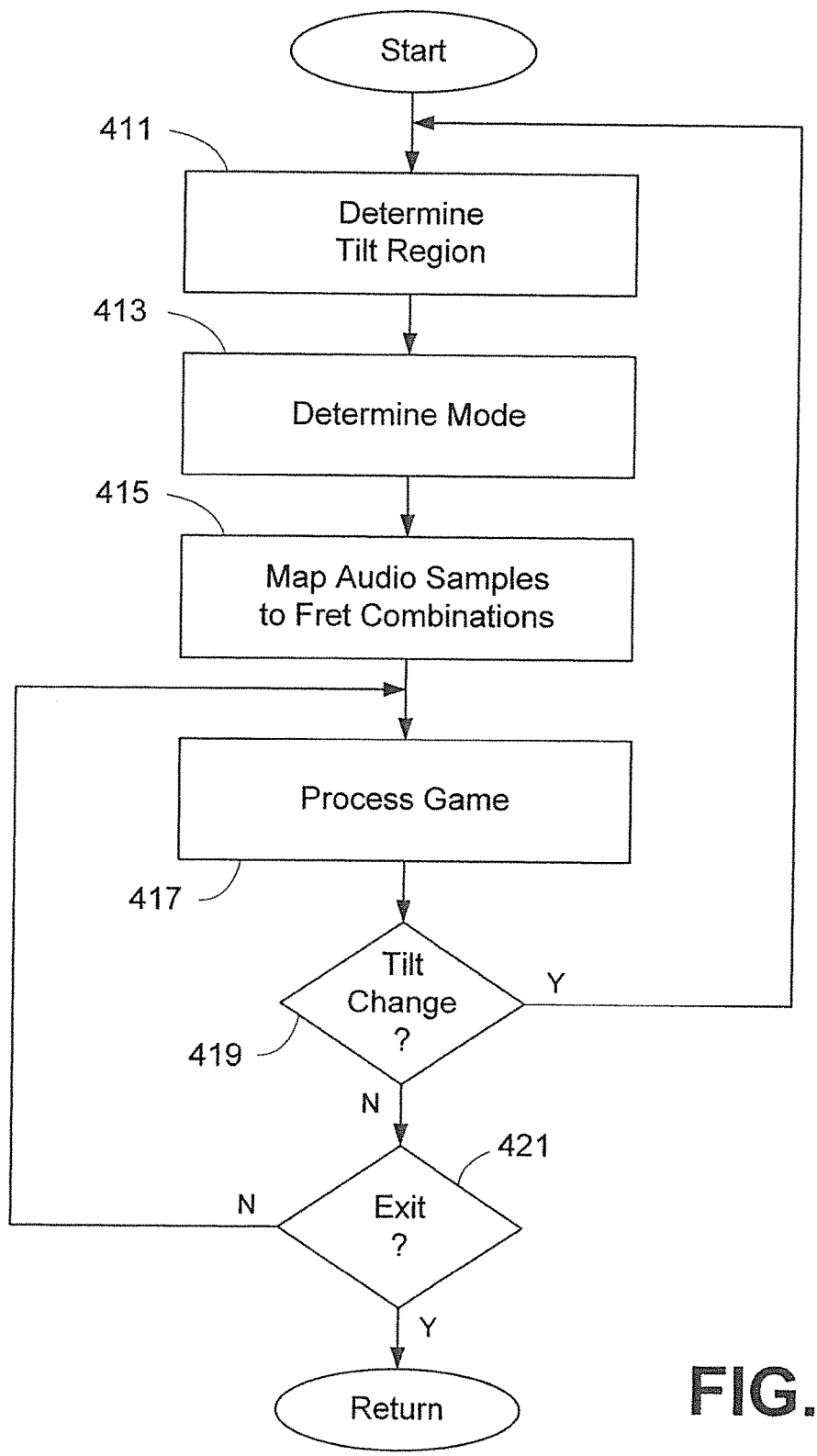
FIG. 4 is a flow diagram of the process of adjusting a mode of a video game controller based on an angular position of the video game controller.

FIG. 4 is a flow diagram of the process of adjusting a mode of a video game controller based on an angular position of the video game controller. In many embodiments the process is performed by a video game console or a processor. As was described with respect to block 317 of FIG. 3 above, in some embodiments video game controller includes a position detection device which determines the angular position or configuration of the video game controller. The angular position is processed by the video game console in determining an audio sample to output.

In block 411, the process determines a tilt region. A processor of the video game console receives an input signal from the video game controller including information on the angular position of the video game controller. The angular position falls within one of a plurality of predefined angular tilt regions, each of which includes an upper angular limit and a lower angular limit. The processor may determine which tilt region the video game controller currently falls within, and determine that region to be the active tilt region. In some embodiments, vibration feedback, using for example vibration generating devices, may be utilized to indicate approach to different tilt regions and/or changes in active tilt regions.

In block 413, the process determines a mode with which the active tilt region is associated. The mode dictates how input signals generated by the video game controller are processed by the processor of the video game console. In some embodiments, each tilt region defines a mode, with each mode designated by the processor for generating a particular type of output signal. Some embodiments of the invention may include, for example, a regular note mode, a power chord mode, and a riff mode. Some embodiments of the invention may include a regular note mode with notes in a first octave, a regular note mode with notes in a second octave, with for example the second octave lower than the first octave, and a riff node. When a tilt region associated with the regular note mode is active, the various fret combinations executable on the video game controller may be mapped to audio samples of single notes. This may be done, for example, by associating various fret combinations with a lookup table referencing single note audio samples. Likewise, when the power chord mode is active, each fret combination may be mapped to power chord audio samples, and when the riff mode is active, the fret combinations may be mapped to different riffs or similar note sequences. Riffs are rhythmic note sequences of varying length which may be used as background audio tracks while other notes or audio samples are being played. Other similar note sequences available in a mode designated for note sequence mappings may be, for example, solo licks, or more intricate note sequences which may be difficult to execute or play on a note-by-note basis.

In block 415, the process maps or associates audio samples to different fret combinations based on the determined mode. In some embodiments, a video game CD-ROM or similar removable memory source holds information on audio sample mappings for each mode of the video game, in the form of, for example, a lookup table. The audio samples available for the determined mode are mapped to different fret combinations executable on the video game controller. Input signals received by the processor of the video game console indicating a particular fret combination are processed by the processor to generate the audio sample or sequence of audio samples mapped to the fret combination. In some embodiments, the mappings may only apply to certain fret combinations, for example, zero fret, one fret, or two fret combinations, which are relatively easier to execute on the video game controller. In these embodiments, the more difficult fret combinations may be mapped to special audio samples useable in every mode, may be user configurable, or may not be mapped to audio samples at all. In other embodiments, the mappings may apply to all possible fret combinations. In embodiments where each mode is designated for a certain type of audio output, each of the mapped audio samples in a particular mode will be of that type. For example, power chord mode may map all power chords to fret combinations, note mode may map all notes, and riff mode may map riffs and similar sequences. Some embodiments may provide for note, chord, or riff configuration options. For example, users may adjust the mappings of different notes, chords, or riffs to different fret combinations, and in some embodiments the card or scrolling notes displays as well. Some embodiments may also provide for audio sample generation and recordation, and in some embodiments sharing of recorded information with remote and local users. For example, users may be allowed to create and record original riffs, and map the riffs to a fret combination.

Some embodiments of the invention may also provide users with one or more instructions or suggestions as to how to operate the video game controller for the video game console to generate pleasing or melodic sounds. As such, the suggestions may be mode-specific, and so in these embodiments, the fret combination mapping process may be accompanied by a selection of video game controller operation instructions or suggestions communicated to the user as well.

In block 417, the process processes video game play. Video game play may include, for example, a free play feature where a user may create his own music using a guitar shaped video game controller, much like picking up and playing a real guitar. The user may use the fret inputs to perform different fret combinations and deflect the strum input to generate input signals. The video game controller may receive and process the input signals to generate output audio, either in the form of single notes or chords, or in a string or sequence of audio samples. In the aforementioned regular note and power chord modes, each strum and accompanying fret combination performed on the video game controller is processed by the video game console to generate notes and chords mapped to each fret combination. Typically audio notes and chords are outputted at substantially the same time each strum input signal is received. In a riff or note sequence mode, each strum and accompanying fret combination may be processed by the video game console to generate different note sequences. In modes involving note sequences, the note sequences are selected based on the fret combinations executed on the video game controller. Each audio note sequence may begin at substantially the same time as an executed strum, but may continue for a longer duration of time, for example, several seconds, or for example, one minute. A subsequent strum and different fret combination may lead the processor to stop outputting an old note sequence and initiate a new note sequence. In some embodiments, users are provided an option of selecting whether to auto-loop a selected note sequence or riff and/or how many iterations to repeat the note sequence or riff. In some embodiments, a note sequence mode may also include more intricate solo-style note sequences, or licks, which may also be initiated by the processor upon receipt of a new set of strum and fret combination input signals. In some embodiments the process may automatically loop some output sounds, for example riffs, unless the process receives a request or command, for example in the form of a predetermined input signal or sequence of predetermined input signals, to cease looping of output sounds. In some embodiments, automatic looping of output sounds may cease, or change to new output sounds, upon beginning of play or completion of a transition card, for example as discussed herein.

In embodiments including controller operation instructions or suggestions, the instructions or suggestions may be presented to users visually in the form of, for example, different fret combinations performable on the video game controller. For example, gem-shaped icons may be displayed to represent different depressible fret buttons. In embodiments of the invention with different modes, different shaped icons, or for example, icons with different hues or transparency levels, may be used to indicate to users the intended mode in which to perform the indicated fret combination instructions or suggestions with the video game controller.

In block 419, the process determines whether the tilt region has been changed. In some embodiments, tilt changes occur when the angular configuration of the guitar shaped video game controller is changed by the user, either by pointing the neck of the video game controller further up or further down with respect to a horizontal reference such as the ground. The processor of the video game controller substantially constantly processes input signals from the video game controller indicating a current tilt position or status of the video game controller to determine the tilt region the video game controller currently falls within. If a change in the tilt region is detected, the process returns to block 411, and a new active tilt region is determined. If no change in the tilt region is detected, the process continues to block 421. Some embodiments may allow users to lock into and out of a particular tilt region by, for example, depression of a predefined button. Such a locking mechanism may be desirable to prevent unintentional shifting into adjacent tilt regions. Tilting or moving the guitar while in the locked position in some embodiments allows for other mapping and uses for the tilt, motion and position inputs. Some embodiments may alternatively provide a form of auditory or visual feedback to the user to notify the user that the controller has been moved into a different tilt region.

In block 421, the process determines whether to exit mode adjustment and game processing. If the process determines to remain in mode adjustment and game processing, the process returns to block 417, and the video game continues being processed in the active mode. If, instead, the process determines to exit game processing, the process returns.

Figure 5:
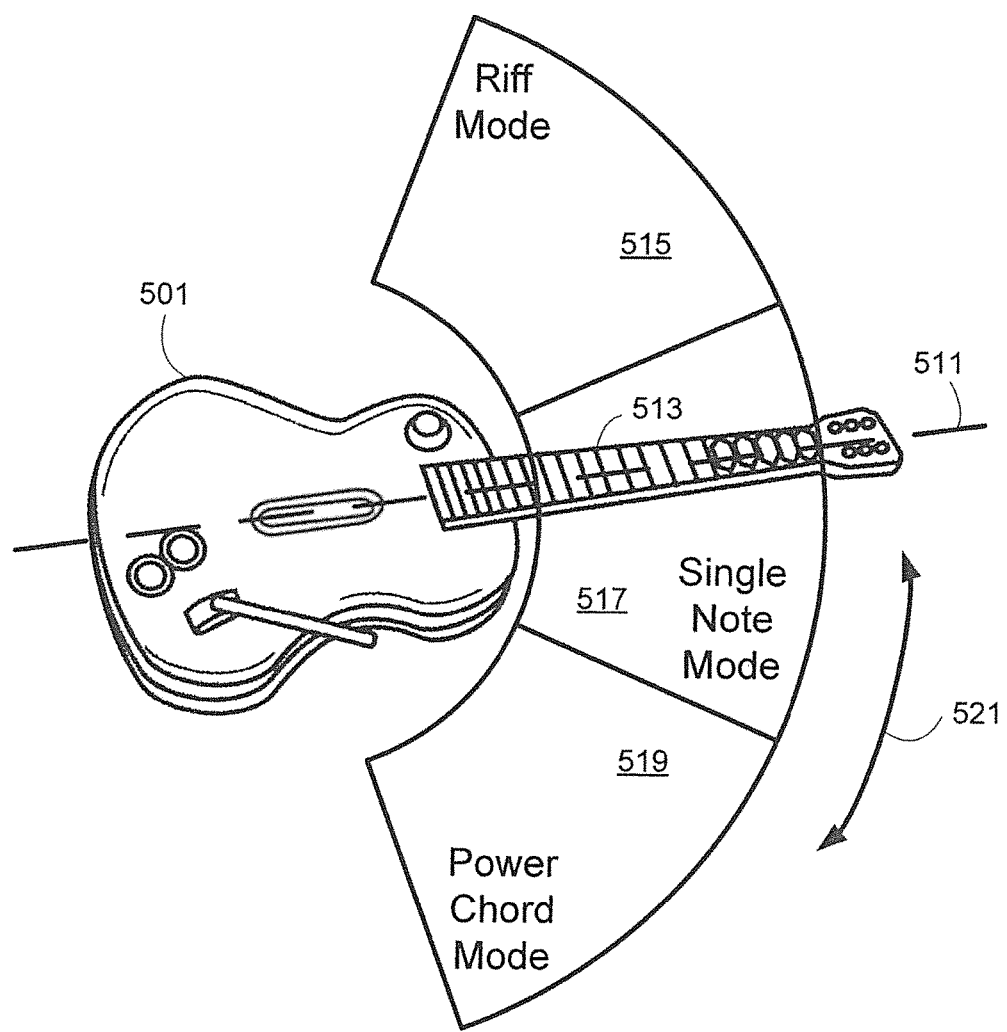
FIG. 5 is an illustration of a guitar shaped video game controller with a different mode assigned to each of three predefined tilt regions in accordance with aspects of the invention.

FIG. 5 is an illustration of a guitar shaped video game controller with a different mode assigned to each of three predefined tilt regions in accordance with an embodiment of the invention. Guitar shaped video game controllers such as the controller 501 illustrated in FIG. 5 may be used in, for example, a musical video game as has been described herein. In embodiments of the invention, the video game controller includes a position or motion detection device, for example, an accelerometer, which generates information on a physical angular configuration of the video game controller with respect to a horizontal reference.

In typical embodiments, an accelerometer in the video game controller detects the tilt position of the video game controller and communicates the tilt position to a processor of an associated video game console. The tilt position may be, for example, an angle representative of the angle the axis of extension 511 of the video game controller neck 513 makes with the ground. In these embodiments, if the neck of the video game controller is parallel to the ground, the tilt position may be characterized as 0 degrees. If the neck of the video game controller is pointed slightly upwards with respect to the ground, the angle may be defined as a positive value. Likewise, if the neck is pointed downwards with respect to the ground, the angle may be defined as a negative value.

In the embodiment of FIG. 5, the video game defines three tilt regions in which the tilt position of the video game controller may reside. Each of the three tilt regions includes information on upper and lower angular limits. For example, a first tilt region 515 may have an upper limit of 150 degrees above a horizontal reference and a lower limit of 50 degrees above the horizontal reference, and a second tilt region 517 may have, for example, an upper limit of 50 degrees above the horizontal reference, and a lower limit of 50 degrees below the horizontal reference. Furthermore, a specific mode of the video game may be associated with each of the tilt regions. In FIG. 5, a riff mode is associated with an upper tilt region, a regular note mode is associated with a central tilt region, and a power chord mode is associated with a lower tilt region 519. As was discussed with respect to FIG. 4, each of the modes may be reserved or dedicated for outputting a particular type or style of audio sample or samples, for example, the namesake riffs, notes, and power chords of each mode. Users may reposition 521 the video game controller to be in different tilt regions to activate the different modes of video game play. In other embodiments, more or less tilt regions may be defined, and/or different mode or note mappings or associations may be made to each defined tilt region.

In some embodiments, a background beat or rhythm may be established while the video game controller is positioned in one tilt region, and notes or chords may be played over the beat or rhythm while the video game controller is positioned in the same or a different tilt region. For example, some tilt regions may provide an option for repeating or looping audio samples. In some embodiments, the looping samples are guitar-based, while in other embodiments, various other instruments, for example, drums, or keyboard, may be featured in looping guide samples. Users may establish a repeating or looping audio track with selected audio samples, and subsequently play over the looping audio track with additional notes or chords. In this fashion, a single user of the video game system may generate multiple sources or layers of audio samples through the video game console, and generate multi-dimensional audio compilations on his or her own. Also, in some embodiments appropriate background beats, bass lines, guitar, vocals and other sounds are provided in song sections based on the number of players, types of simulated instruments selected and the selected player levels.

Figure 6:
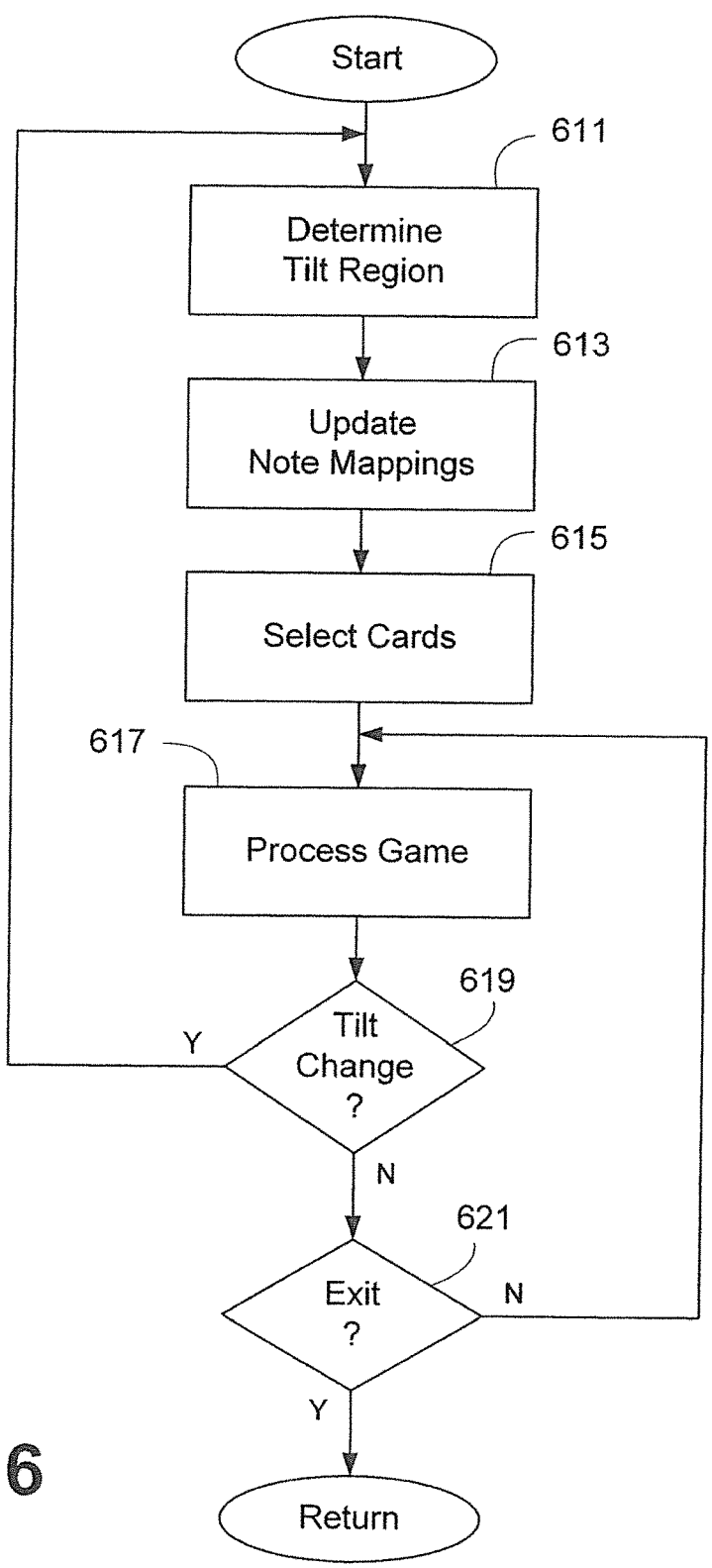
FIG. 6 is a flow diagram of a process of presenting note suggestion cards to users in accordance with aspects of the invention.

FIG. 6 is a flow diagram of a process of presenting note suggestion cards to users in accordance with aspects of the invention. In some embodiments, multiple cards are simultaneously presented to a user, with each card including information on suggested or recommended note or chord sequences for the user to follow through operation of a guitar shaped video game controller. The note suggestion cards may provide information on different series of fret combinations that may be executed on the video game controller. The input signals generated by the fret combination sequences may be processed by the video game console into audio output signals which fit harmoniously with, for example, a background audio track being output simultaneously. In some embodiments, multiple different note suggestion cards are presented to the user simultaneously, for example, three or four different cards as illustrated in the screen shot in FIG. 1. The cards present various different recommendations as to how to operate the video game controller, and in most embodiments and instances are not obligatory compliance instructions. More or less cards can be used in multiplayer situations. In addition for drums, continuous scrolling notes may be used instead of semi-static cards. In some embodiments, however, compliance with some note suggestion cards may serve as prerequisites for unlocking certain features of the video game, for example, new note suggestions cards or new songs or background audio tracks. In some embodiments, information on note cards can scroll or highlight in patterns that are in time with the song.

In block 611, the process determines the angular tilt region the guitar shaped video game controller is in. The configuration of the angular tilt regions may be similar to the angular regions described with respect to block 315 of FIG. 3 and the illustration of FIG. 5. Input signals may be generated by the video game controller to communicate to the processor of a video game console the particular tilt region in which the video game controller is currently positioned.

In block 613, the process updates the note mappings of the video game controller. Each fret combination, and other available input combinations, may be mapped to different audio output samples or signals, that is, the processor of the video game console processes input signals indicating execution of different fret combinations to generate various different audio output signals. In some embodiments, the fret combinations are mapped to different audio output or sample types depending on the tilt region in which the video game controller is positioned. For example, in some embodiments, one tilt region is reserved for guitar power chord mappings, a second tilt region is reserved for single guitar note mappings, and a third tilt region is reserved for setting background audio track mappings. Therefore, an input signal generated by a particular fret combination in one tilt region may be processed by the video game console into a first audio output, while the same fret combination in a second tilt region may be processed into a second different audio output. The process therefore updates the note mappings to the various fret combinations based on the determined tilt region.

In block 615, the process selects multiple note suggestion cards based on the particular tilt region the video game controller is currently positioned and the new note mappings. In embodiments where the tilt region determines whether the video game controller outputs a note, a chord, or a sequence of notes or chords, or even where tilt regions affect mappings of similar types of notes, particular note suggestion sequences may only be appropriate for select tilt regions. Therefore, the multiple note suggestion cards presented to the user may be tilt region specific, and may be changed depending on the particular tilt region the video game controller is in. The processor of the video game console selects a new set of note suggestion cards appropriate for the current tilt region and new note associations. In some embodiments, however, the selection of the multiple note suggestion cards may be performed without reference to tilt of the video game controller.

In block 617, the process processes video game play. In embodiments with user directed note generation, video game play may include a forum for users to create audio output compilations, for example, musical songs or audio tracks, through the video game console based on input signals generated though the video game controller. The user may create his or her own musical compilations, or may opt to follow one or more of the note suggestion cards presented by the video game console in the context of video game play.

In block 619, the process determines whether the tilt region of the video game controller has been changed. During video game processing, the process may continually or periodically monitor the tilt level of the video game controller, and determine whether a tilt change has occurred. If a tilt change has not occurred, the process may proceed to block 621, and eventually return to game processing in block 617. If a change to the tilt region has been detected, the process instead proceeds back to block 611 to determine the new tilt region and make the necessary adjustments to game play based on the new tilt region.

In block 621, the process determines whether to exit. If the process determines to remain in game play, the process returns to block 617, and continues processing video game play. If the process determines to exit, the process returns.

Figure 7:
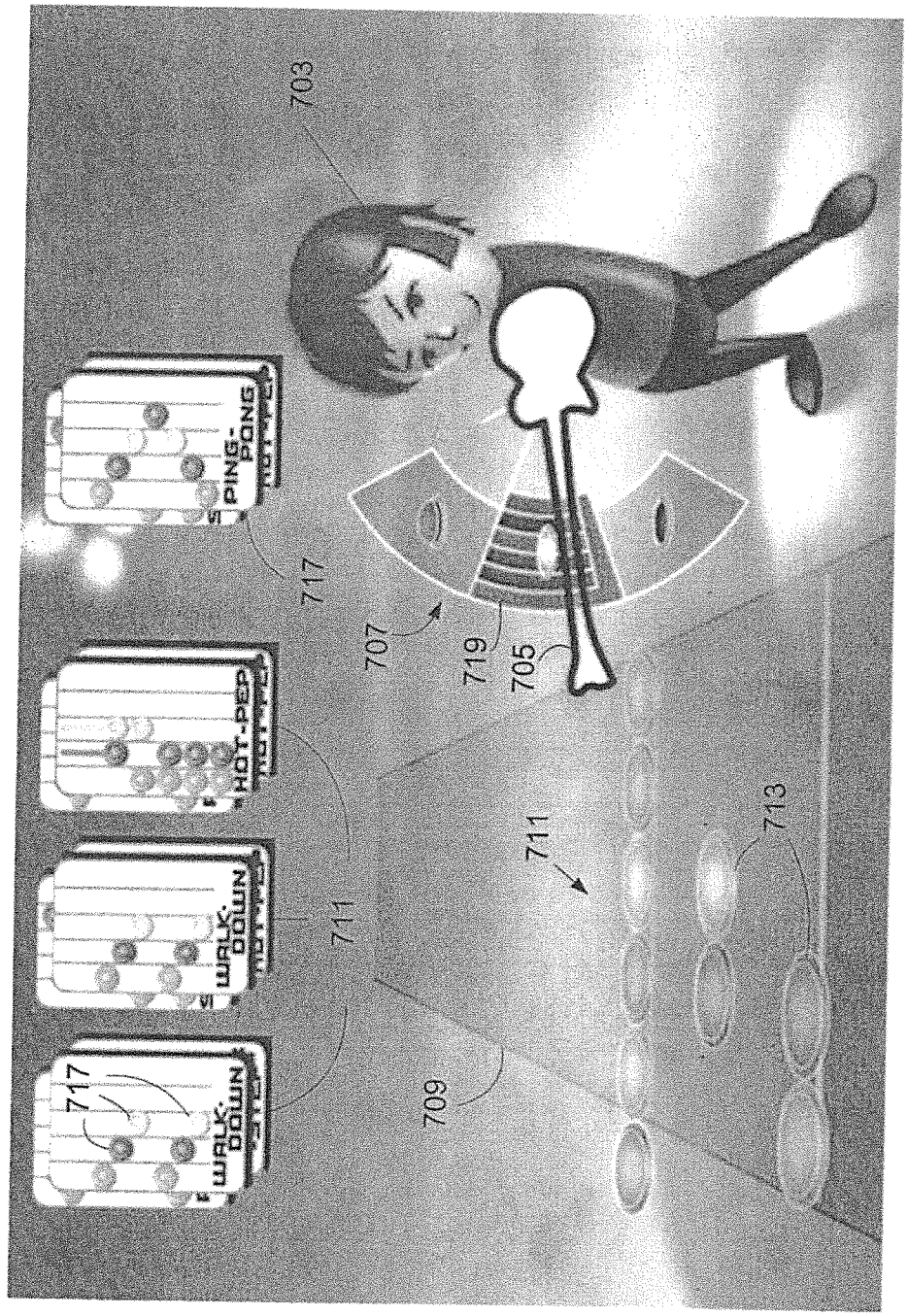
FIG. 7 is a screen shot of a user interface of a music based video game during user directed sound generation in accordance with aspects of the invention.

FIG. 7 is a screen shot of a user interface of a music based video game during user directed sound generation in accordance with aspects of the invention. The user interface is the same interface presented and briefly described with respect to FIG. 1. In some embodiments, the user interface presented in FIG. 7 is used in conjunction with a music video game including a guitar shaped video game controller, where the video game console processes input signals from the video game controller to generate output audio samples simulating real rhythm guitar, lead guitar or bass sounds. The user interface includes multiple note suggestion cards 701 running along the top of the screen which users may choose to follow, a video game character 703 holding a guitar 705, which serves as a tilt level indicator and a tilt region indicator 707, and a scrolling music track 709 displaying the current fret fingering being executed on the guitar shaped video game controller 711, as well as the most recently executed fret fingerings 713.

A music based video game with a user directed sound generation feature allows users to create their own musical compilations in a free play environment, without being obligated to comply with specific video game instructions. User directed sound generation closely emulates the playing of a real instrument, through the use of a simulated instrument such as the guitar shaped video game controller as has been described herein.

Often in a free play environment, even with real instruments, musicians may desire some help or suggestions as to what to play. The user interface therefore provides multiple note suggestion cards recommending note or chord sequences which may be executed on the video game controller to generate pleasing audio outputs through the video game console, which fit into the context of the background music or audio track being played. Each note suggestion card includes a series of fret combinations to be depressed while operating a strum bar, with circular icons, for example, icons 715 indicating the fret buttons to be depressed for each fret combination. Some embodiments also include an icon for an open note, signifying operation of the strum bar without depression of any fret buttons, and some embodiments include icons for hammer ons and hammer offs, with the fret buttons operated without, at times, operation of the strum bar. In some embodiments, as the player plays the notes on a card, the completed notes and other action indictors used to instruct the player to complete actuation combinations in conjunction with their selected instrument are highlighted in real time to display that they are completed. In some embodiments, a full card must be completed accurately to switch to a new card or other static display. If a card is played incorrectly the completed notes are cleared and the player must start over. On the cards, each horizontal row indicates a different fret combination, while vertical displacement separates the suggested fret combinations sequentially. In the embodiment of FIG. 7, the sequences run from bottom to top, where users may perform a suggested note sequence presented on a card by executing each fret combination starting with the bottommost fret combination and working upwards. Typically, the cards are separated into five columns, each column corresponding to one of the fret buttons on a guitar shaped video game controller with five fret buttons. The circular icons in different columns may be colored or shaded differently, with each color or shade matching the physical color of the fret buttons, or slider buttons, on the actual video game controller, for users to more easily associate the suggested fret combinations on screen with fret fingerings on the video game controller. Other indicators such as a wavy line can instruct a user to hold a note, to move the whammy bar, or to slide a finger on the slider for example. Generally, the user interface provides three or more note suggestion cards, sometimes including a transition card 717 at specific intervals of video game play, of which further discussion may be found with respect to FIG. 9 below.

The note suggestion cards may include various types of note sequences. For example, embodiments of the invention may show different note durations, such as whole notes, quarter notes, eighth notes and sixteenth notes, etc. The note suggestion cards may also include other information, for example, whether a fret fingering should be held after a strum or whether the fret fingering should be staccato and abruptly released, or for example, whether a hammer-on or pull-off should be performed, that is, whether the fret fingering should be changed shortly after a strum. A similar visual system may be utilized in the suggested scrolling display and presented in the user played scrolling display to reinforce learning of the distinct visual indicator types. In user directed sound generation, users may operate the video game controller in any way they desire, and there is generally no pressure to comply with the note suggestion cards. However, in some embodiments, successful compliance with a predefined amount of note suggestion cards, or with specific note suggestion cards, may unlock additional cards or other features of the video game, providing a small incentive to comply with the cards. In other embodiments, incentives may also include video game animations or effects involving a video game character or background venue.

At the bottom right of the user interface is a video game character, generally representing the user of the video game system. In some embodiments, the user may adjust the appearance of the video game character, for example, to more closely resemble the user, or for example, to give the character a more distinct or more appealing look. In FIG. 7, the video game character is holding a guitar or a virtual instrument in the shape of a guitar. The guitar serves as a tilt level indicator, indicating the current tilt level at which the video game controller is orientated. Along with the tilt level indicator is displayed tilt regions, including a currently active tilt region 719. In the embodiment of FIG. 7, there are three tilt regions, but other embodiments of the invention may include more or less than three tilt regions depending on the configuration of the particular embodiment. In some embodiments, the neck of the guitar protrudes into one of the displayed tilt regions, indicating that tilt region as the active tilt region. In FIG. 7, the active tilt region is the center tilt region. The active tilt region may also be colored or shaded differently than the other tilt regions to identify it as the active tilt region At the bottom left of the user interface is a scrolling music track. The scrolling music track serves as an indicator of the fret fingering currently being executed on the guitar shaped video game controller, as well as recently fingered fret combinations. The scrolling track may increase and decrease speed based on the note density with respect to time. The scrolling music track provides a user with feedback as to the sequences of input signals the user has been generating, and how well the sequences comply with a particular note suggestion card they may be trying to follow. In some embodiments, the invention may be configured to record into memory the fret combinations executed on the video game controller and displayed on the scrolling music track, providing users with access to their previously played compilations. Recorded or saved information may also include timing of the fret combinations, as well as tilt information and information on successfully and unsuccessfully complied with cards during a recording session. In some embodiments, the scrolling music track may also provide the user with an enlarged or zoomed in view of a card the user has initiated compliance with, so that the user may be provided a larger and clearer view of the note suggestions on a particular card.

Figure 8:
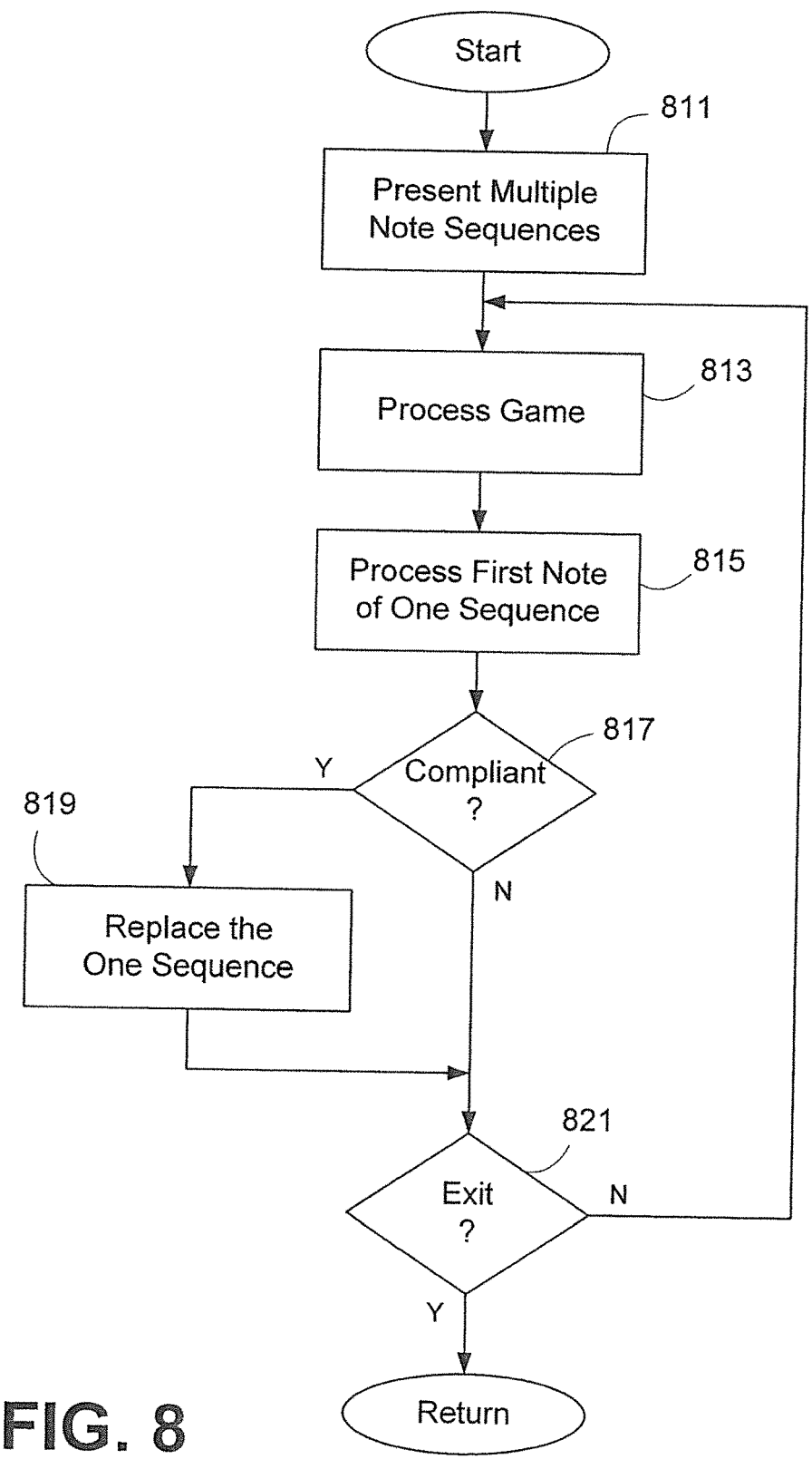
FIG. 8 is a flow diagram of a process of replacing cards which have been completed during video game play in accordance with aspects of the invention.

FIG. 8 is a flow diagram of a process of replacing cards which have been completed during video game play in accordance with aspects of the invention. Embodiments of the invention have been described where the user interface simultaneously presents multiple note, pitch, beat, or other musical suggestion cards or semi-static displays to a user to suggest different ways to operate, for example, fret buttons on a guitar shaped video game controller. If the process determines that one of the multiple note suggestion cards is being followed, the process determines the card being followed, and tracks the progress of the user and whether he ends up fully complying with the card.

In block 811, the process presents multiple note suggestion cards with different note sequences. As was seen with respect to the note suggestion cards presented in FIG. 7, there may be multiple different note sequences which the user may choose to follow and comply with through operation of the guitar shaped video game controller, or which the user may choose to ignore completely and freely operate the video game controller.

In block 813, the process processes general game play. As has been mentioned, in a user directed sound generation setting, the user may generate input signals using the video game controller. A processor of a video game console receives the input signals and provides musical audio outputs based on the particular input signals received. In this fashion, users may simulate the playing of a real instrument by using the video game controller to create musical compilations through the video game console.

In block 815, the process processes a first note of a note sequences presented on one or more of the multiple note suggestion cards. The user may execute a fret fingering, on the video game controller which matches the first fret combination of one or more of the note suggestion cards. The video game controller may generate input signals including information on the fret combination, and the processor of the video game console may generate a note it recognizes as a first note of one or more of the suggested note sequences. In some embodiments, the processor then highlights the particular note suggestion card or cards, and awaits further input signals from the video game controller to see if the user has generated input signals compliant with the fret combinations presented on any of the highlighted note suggestion cards. In some embodiments, the highlights can start over after a certain amount of time or a mistake.

In block 817, the process determines compliance with a highlighted note suggestion card. In some embodiments, the processor of the video game console may track the subsequent input signals received from the video game controller until one of two events occur. If the subsequent input signals generated by the user are not compliant with a suggested note sequence on a highlighted card at any point in the sequence, the process proceeds to block 821, where the process may begin awaiting another first note of at least one of the presented note sequences. If the process determines that the suggested note sequence of a highlighted card is successfully complied with and completed, the process proceeds to block 819. In some instances, for example, instances where multiple cards have the same first note, there may be more than one highlighted card. In such instances, the process may track compliance with each of the highlighted cards individually, and determine non-compliance only if all of the highlighted cards are not complied with.

In block 819, the process replaces a successfully completed note suggestion card with another card presenting a different suggested note sequence. In some embodiments, completion of note suggestion cards may result in the awarding of points or other bonuses in the context of video game play. In other embodiments, completion of note suggestion cards reveals new suggestions, providing the user with new and innovative note sequences to execute using the video game controller. In some embodiments, note suggestion cards may also be arranged in mini decks or collections, where a note sequence starting on a first card is continued on a subsequent card, so that multiple subsequent cards may fit together to form a longer suggested note sequence. In some embodiments, the processor may also include more intricate card replacement animations. For example, a note suggestion card may start burning or showing a similar highlight from bottom to top while the note sequence on the card is being complied with, to partially reveal the underlying card or discoloring the played notes or beats In block 821, the process determines whether to exit the card compliance and replacement process of FIG. 8. If the process determines to remain in card compliance and replacement, the process returns to block 813 and continues processing the game. If the process determines to exit, the process returns.

Figure 9:
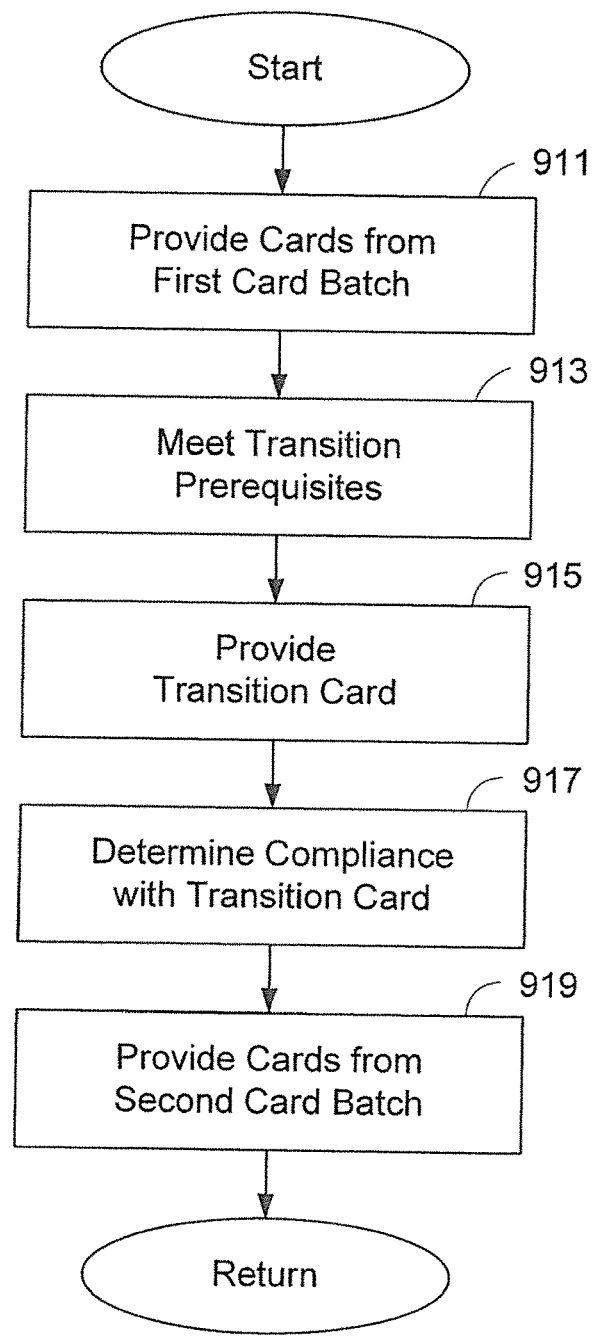
FIG. 9 is a flow diagram of a process of transitioning from a first section of a song to a second section of a song in accordance with aspects of the invention.

FIG. 9 is a flow diagram of a process of transitioning from a first section of a song to a second section of a song in accordance with aspects of the invention. The process may be performed for example by a processor or a video game console. Often, songs may be separated into different sections, for example, an introduction, a chorus, a solo section, and a bridge section. In addition, in some instances a transition may be provided between song sections, and at times the transition may also be considered a song section. Further, particular note sequences may be used for select song sections and not for others. For example, an introduction typically includes a serene rhythm or a softer section of the song, in many instances to build anticipation for the song. Other examples include note sequences in choruses or bridges which provide catchy rhythms, or solo sections which provide more intricate and difficult note sequences. Some embodiments of the invention, therefore, separate note suggestion cards into different batches, with cards drawn and presented from, and in some embodiments only from, batches which are appropriate for a current song section, and the current song section may change during video game play, generally as part of video game play.

In block 911, the process provides cards from a first card batch in accordance with a current song section. The process determines the current song section, and determines the specific batches of cards from which to draw note suggestions cards to present in the user interface. For example, at the outset of user directed sound generation, the song section may be set as an introductory section, with cards selected from a batch with note sequences appropriate for a song introduction. In the middle of a song, after one or more transitions for example, the song may be in a rhythmic or bridge section, and the process may select cards from a batch reserved for rhythmic or bridge sections of the song.

In block 913, the process determines that prerequisites for a transition to a new section have been met. In some embodiments of the invention, the process provides for transition opportunities into new sections of a song when one or a set of prerequisites are met by the user. Examples of prerequisites may include, for example, successful compliance with a predefined number of note suggestion cards, successful compliance with a predetermined note suggestion, or receipt of particular input signals indicative of a request or command to transition to a different song section. In still other embodiments the prerequisites may be passage of a certain duration of time in a song section, for example 30 seconds or one minute. In other embodiments, prerequisites for transitioning may not be established, and the user may be allowed to freely transition from one song section to a different song section through play of a particular note sequence of a card presented on the display providing a transition, or by some other action.

In block 915, the process provides a transition card to the user. In some embodiments, a transition card is a card with a note or note sequence suggestion, which upon completion, transitions the video game from one song section into a different song section. The transition card may be similar to or the same as a normal note suggestion card, and include a particular note sequence, which may be, for example, a popular and easily recognizable note sequence commonly used to bridge two sections of songs together, although in most embodiments the particular note sequence, and all note sequences presented on the cards, is an original note sequence created specifically for use in a video game. In some embodiments, the transition card may be easier to comply with, for example, the card instructing play of a single chord with a three or four fret button combination. The transition card will generally be positioned in the user interface apart from other note suggestion cards to differentiate it from other note suggestion cards. For example, in the user interface of FIG. 7, the transition card may be the rightmost card, spaced apart and distinguishable from the other note suggestion cards. In other embodiments the transition card may be distinguishable by color, or by shape, or by some combination of color and shape. In some embodiments, the transition card appears regardless of the active tilt region. In other embodiments, the transition card may only appear when the video game controller is positioned in certain tilt regions, for example, to prevent a user from accidentally transitioning into a different section of the song while in the other tilt regions.

In block 917, the process determines user compliance with the transition card. Compliance with the transition card is similar to compliance with regular note suggestion cards. A fret combination or series of fret combinations is presented to the user, and the user attempts to follow or match the fret combination or combinations by operating the fret buttons and/or strum bar of a guitar shaped video game controller. Successful compliance with a transition card results in a transition from a first song section to a second different song section. For example, if video game play is currently in a chorus song section, and a transition card appears on the user interface, the user may choose to successfully comply with the transition card. Upon compliance with the transition card, the video game may transition the song into a subsequent section, for example, a solo section of the song.

In block 919, the process provides cards from a second card batch associated with a further song section. In most embodiments, upon completion of a transition card, the process may replace all the note suggestion cards displayed on the user interface with a new set of note suggestion cards. The prior note suggestion cards may be from a batch associated with a different song section, and may not be appropriate for the new song section. The replacement note suggestion cards are preferably drawn from a different batch of cards associated with the new song section to ensure that the newly presented note sequences harmoniously fit into the context of the new song section. After the process provides note suggestion cards from the new card batch, the process returns. In some embodiments the combination of cards and notes on cards of the new card batch may be generated by the process according to preset rules, for example rules varying card information if a user transitions to the same section repeatedly.

Figure 10:
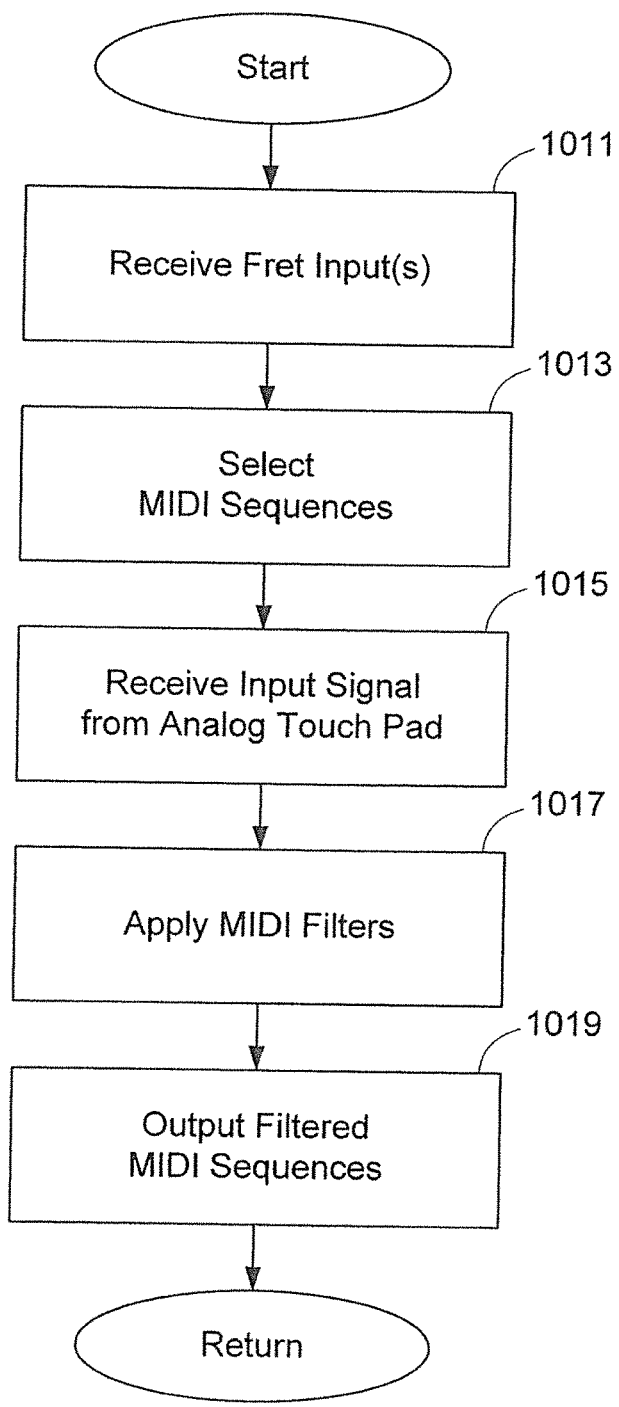
FIG. 10 is a flow diagram of an alternate process of determining audio outputs in accordance with aspects of the invention.

FIG. 10 is a flow diagram of an alternate process of determining audio outputs in accordance with aspects of the invention. A video game controller, for example, the video game controller described with respect to FIG. 1, is operated by a user and generates input signals including information on the user operation of different input devices of the video game controller. Such an alternate embodiment may only be active in certain tilt regions, for example, the tilt region corresponding to a riff mode, or may be activated by a predefined input or sequence of inputs. In a music video game similar to the one described with respect to FIG. 1, audio outputs may be in the form of audio samples recorded from instruments, for example, guitars, drums, or keyboards. In some embodiments, the audio samples may be MIDI based audio samples. Some embodiments may provide users the option of establishing a background audio track using audio samples of a first instrument or set of instruments, for example, a drum set, and thereafter perform single notes, chords, or note sequences with audio samples of a second instrument or set of instruments, for example, an electric guitar or a keyboard, over the pre-established background audio track.

In block 1011, the process receives a fret input or inputs from the video game controller. In some embodiments, the video game controller generates an input signal when a fret input or multiple fret inputs are depressed. In other embodiments, the video game controller may continually generate input signals including information on status of the fret inputs, and a processor of a video game console may detect a change in the status when, for example, one or more of the fret input is depressed or released. In yet other embodiments, an input signal may be generated by the video game controller when a strum input is deflected upwards or downwards, with information on the status of each fret input depressed at the time the strum input was deflected.

In block 1013, the process selects sets of MIDI sequences to output. In most embodiments of the invention, each fret input or fret input combination is mapped to a different set of MIDI sequences. Some embodiments may feature different drum performances including MIDI-based audio tracks from multiple different types of drums, including multiple audio samples of different drum components of a drum set. Such a performance may include, for example, separate snare drum, kick drum, and hi-hat audio tracks, as well as additional audio tracks featuring further drum components. Drums, drum fills and drum beats can be played with cards on a guitar controller. On beginner levels basic beats can be provided to keep the band in time. Many of these performances may be prerecorded and stored in, for example, the video game CD-ROM, or may have been previously created or recorded by a user in a different mode or feature of the particular video game. In these embodiments, a first fret input may be mapped to a collection of MIDI-based audio tracks making up a first drum performance, while a second fret input may be mapped to a collection of audio tracks making up a second, different, drum performance, using the same or similar drum set. Therefore, each fret input may be mapped to different drum performances, with each performance including audio tracks using the same drum components, for example, snare, kick, hi-hat, or crash cymbal. In some embodiments, video game information found on, for example, a video game CD-ROM, may include a lookup table providing for different sets of MIDI sequence mappings to various fret inputs or fret input combinations. In some embodiments, audio samples may include MIDI samples from other instruments, or for example, non-MIDI audio samples, depending on each individual embodiment.

In block 1015, the process receives an input signal from an analog touch pad on the video game controller. In embodiments using the guitar shaped video game controller described with respect to FIG. 1, the input signal may be generated by the video game controller when, for example, a finger or other actuator depresses a portion of the analog touch pad, with the input signal including information on the portion of the touch pad depressed. In some embodiments, input signals are continually generated by the video game controller and sent to a processor of the video game controller, and may include status information on the status of for example, the analog touch pad. In these embodiments, the processor may respond to any status changes detected by the touch pad. Alternatively, the process may receive a variety of different input signals, for example, an input signal indicating operation of any input device available on the video game controller other than the fret inputs, or any secondary input signal type different than a primary input signal type used by the process in block 1013 selecting initial MIDI sequences. Depending on the configuration of the video game controller used in conjunction with the invention, the process may specify or designate different primary and secondary input sources.

In block 1017, the process applies MIDI filters, or similar filters for filtering different parts of the selected MIDI performances or compilations, for example, in block 1013 of the process. In some embodiments, the process may apply the filters based on, for example, the input signals generated by the analog touch pad in block 1015. Different filters may be associated with different input signals from the analog touch pad, much like different MIDI sequences were mapped to different fret inputs in block 1013. For example, for a drum set sequence, depression of a first portion of the analog touch pad may filter out a snare drum MIDI sequence, depression of a second portion of the analog touch pad may filter out a kick drum MIDI sequence, and depression of a third portion of the analog touch pad may filter out all MIDI sequences besides the kick drum sequence, or alternatively add those elements. In embodiments using the General MIDI protocol, audio samples for each drum component are assigned a different channel and note designator. For example, the snare drum sample is assigned channel 10, note 38 in the General MIDI protocol, while the hi-hat sample is assigned channel 10, note 46. In these embodiments, applying a filter may include blocking a particular MIDI audio sample from being output by blocking specific channel/note combinations in the MIDI protocol. In other embodiments, the process may not use the MIDI protocol, in which case audio sample filtering may be accomplished in a variety of alternate ways.

In block 1019, the process outputs the unfiltered MIDI sequences. A user may thus operate the video game controller to select a desired prerecorded drum cadence or sequence by operation of a first set of input devices, for example, the fret inputs on the guitar shaped video game controller as has been described herein. The user may then operate the video game controller to filter out different components of the drum sequence by operation of a second input device or set of input devices, for example, the analog touch pad, tilt, or whammy. In this fashion, a user may generate and modify a wide range of audio samples through simple manipulation of the video game controller. Depending on the embodiment, audio samples of other instruments may also be output in conjunction with the invention, for example, keyboard audio samples or guitar audio samples. After the unfiltered MIDI sequences are output, the process returns.

Figure 11:
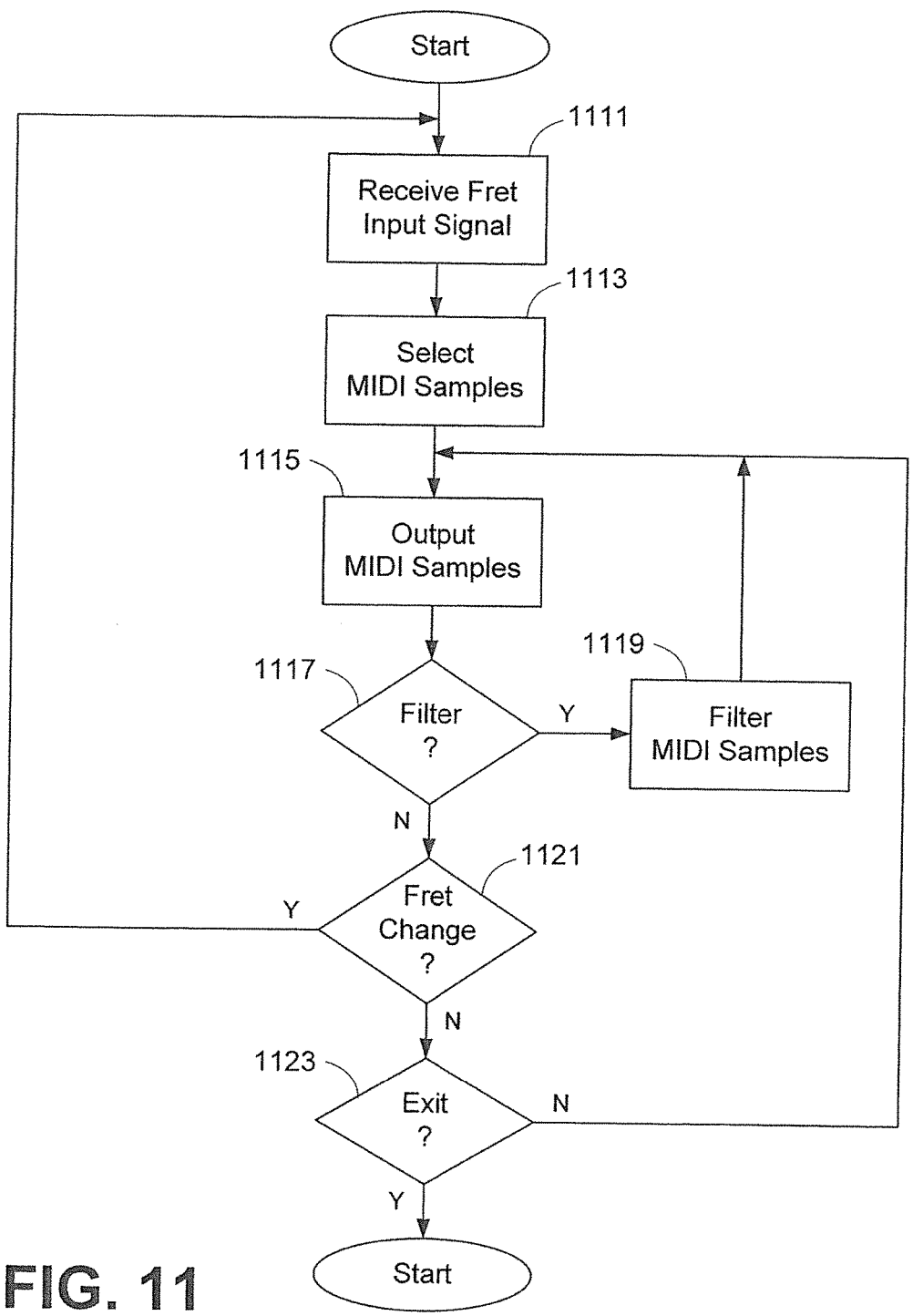
FIG. 11 is a flow diagram of a dynamic process of determining audio outputs in accordance with aspects of the invention.

FIG. 11 is a flow diagram of a dynamic process of determining audio outputs in accordance with aspects of the invention. FIG. 11 may be employed during game play of, for example, a music based video game, to generate different audio samples from a video game console through operation of an associated video game controller. In many respects, the process of FIG. 11 is similar to the process of FIG. 10, with the addition of real-time adjustments to either the MIDI sample selections or the applied filters through user manipulations of the video game controller. While the following discussion focuses on a preferred embodiment using specific input devices on a guitar shaped video game controller, it is to be understood that different input devices and different audio sample formats may be employed depending on the details of each individual embodiment, many variations of which were alluded to with respect to FIG. 10.

In block 1111, the process receives a fret input signal. A fret input signal may be generated by the video game controller through specific operation of a plurality of available fret inputs. The video game controller may generate an input signal including information of depression of one or more fret inputs, and send the input signal to a processor of a video game console. Alternatively, the processor of the video game console may monitor the status of all the fret inputs and detect changes in the status.

In block 1113, the process determines a set of MIDI samples mapped to a particular fret input signal. Most embodiments select MIDI sample sets based on the fret input signal received in block 1111. The MIDI sample sets may be drum-based, including individual parts for, for example, a snare drum, a kick drum, and a hi-hat cymbal. A collection of MIDI samples generally combine to create a musical performance, such as a drum solo or fill, and generally have a duration lasting between a few beats and multiple measures of music. In most embodiments, once a set of MIDI samples concludes, the set is looped back to the beginning and repeated. The MIDI samples may alternatively be, for example, guitar-based, and include individual parts for a lead guitar, a rhythm guitar, and a bass guitar.

In block 1115, the process plays the selected set of MIDI samples. In many instances, a selected set of MIDI samples may be used by a novice user of the video game to play more advanced sequences of notes with minimal practice. In other instances, a selected set of MIDI samples may be utilized in the context of a music video game as a source of background audio or background beat. Users in these instances may be allowed to command the video game console to output one or more of the sets of background MIDI samples, and subsequently play individual notes simultaneously with the background samples.

In block 1117, the process determines whether to filter one or more individual MIDI samples or tracks from a selected set or collection of MIDI samples being output. Generally, multiple MIDI samples are being output by the process at any given time. Through user operation of predefined input devices on the video game controller, for example, the analog touch pad located on the neck of the guitar shaped video game controller as described in FIG. 1, a user may dictate which of the MIDI samples being output by the video game console are to be muted or filtered out. If an input signal corresponding to application of a MIDI filter is detected, the process proceeds to block 1119. If, however, an input signal corresponding to application of a MIDI filter is not detected, the process instead proceeds to block 1121.

In block 1119, the process filters individual MIDI samples from a set of MIDI samples being output by the video game console. The specific MIDI samples filtered or blocked may be determined based on an input signal or signals received from, for example, the analog touch pad, as was described with respect to block 1117. A performance comprised of separate MIDI samples may include sounds generable from a plurality of different instruments. For example, in a drum performance, different components of a drum set may be represented in any given performance. Under the General MIDI protocol, each individual instrument type may be defined by a channel and note, and be identified as such by the processor of the video game console. For example, different drum samples under the General MIDI protocol may be identified by different channel/note combinations as was described above with respect to block 1017 of the process of FIG. 10. Different filtering mechanisms may designate particular MIDI channel/note combinations, corresponding to different MIDI samples, to filter. For example, one particular input signal from the analog touch pad may be identified by the processor for filtering or blocking channel 10, note 46, corresponding to audio samples associated with a hi-hat cymbal, from being output by the video game console. Other input signals generated through the analog touch pad may filter other MIDI samples from a set of audio samples in a similar fashion. After filtering is complete, the processor returns to block 1115 and outputs the remaining unfiltered MIDI samples.

In block 1121, the process determines whether a fret change has been received or detected. In most embodiments, each fret input or fret input combination is mapped to a prerecorded set of MIDI samples, for example, a performance utilizing multiple instruments, or alternatively, multiple components of a dynamic instrument such as a drum set. User depression of a different fret input or fret input combination may be processed by the video game console to output a different prerecorded set of MIDI samples. In this fashion, a single fret input depression may lead to generation of a musical composition including multiple instrumental parts through the video game console. Changing of the fret input or inputs may thereafter lead to generation of a different composition, so that even more novice users may be able to easily generate intricate pieces of music in the context of the music video game. If the process determines a fret change has occurred, the process returns to block 1111 to determine the new fret input signal. If the process determines that no fret change has occurred, the process proceeds to block 1123.

In block 1123, the process determines whether to exit audio outputting. If the process determines to continue outputting audio samples in the context of the music video game, the process returns to block 1115 and continues to output MIDI samples. If, instead, the process determines to exit audio outputting, the process returns.

Figure 12:
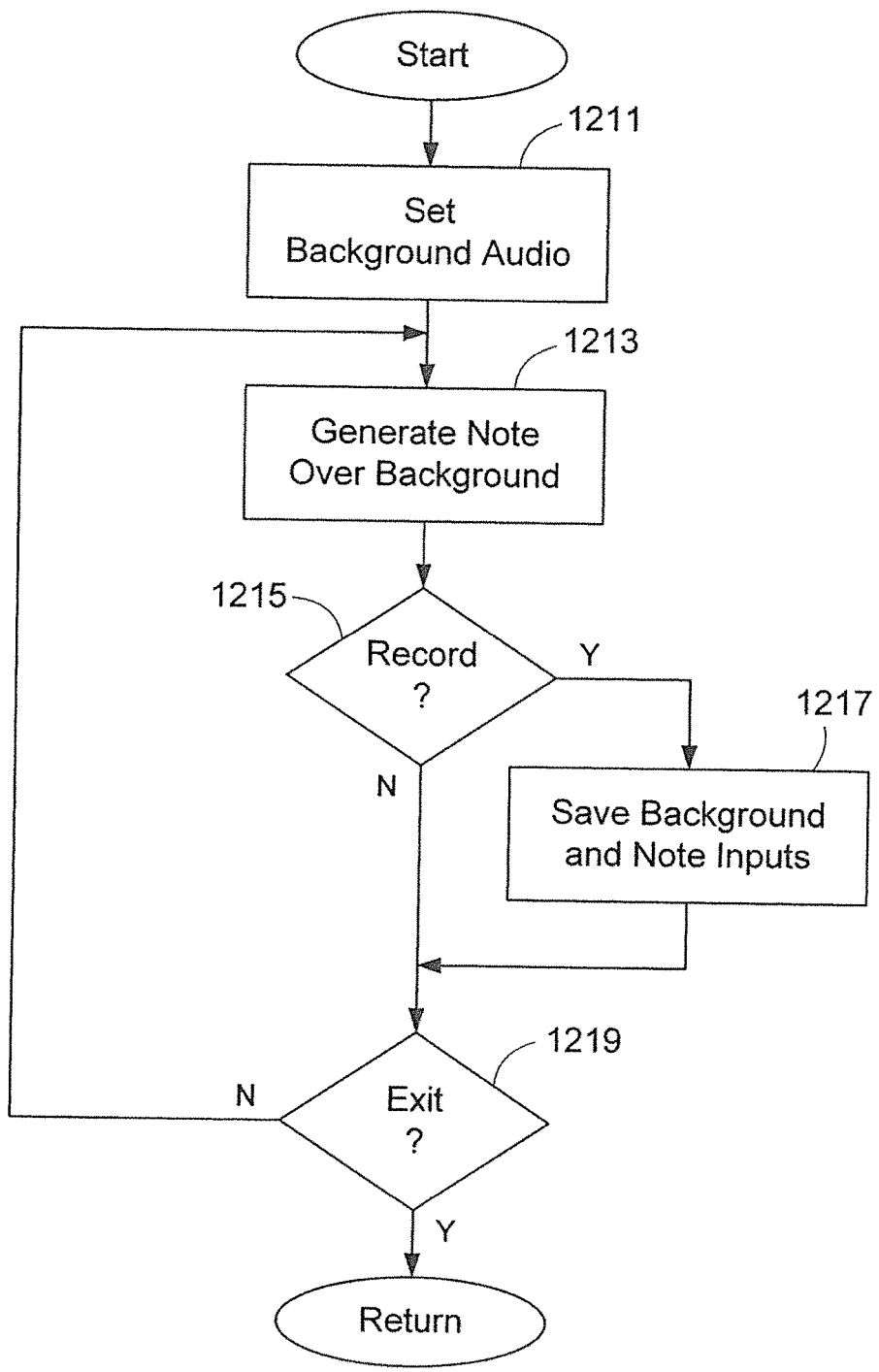
FIG. 12 is a flow diagram of a process of generating and recording a multi-dimensional or polyphonic audio compilation in accordance with aspects of the invention.

FIG. 12 is a flow diagram of a process of generating and recording a multi-dimensional or polyphonic audio compilation in accordance with aspects of the invention. In some embodiments, a riff mode may be available. For example, in some embodiments a user may set and loop a selected riff or rhythmic sequence of notes as a background beat or audio source, while in some embodiments the process may determine a riff or riffs to play. In these embodiments, users may subsequently generate notes over the established background audio, and in some embodiments users may select alternative riffs as background audio or operate a video game controller so as to result in the process receiving input signals from the video game controller instructing the process to cease playing some or all of the background audio. In some embodiments, repeating and looping may not be limited to a riff mode, but may instead be available for all modes, whether the mode is typically used for generation of note sequences or single notes or chords. Some embodiments may further provide non-guitar based audio loops, for example, drum background beats, for use as repeating background audio.

In block 1211, the process selects a background audio beat or riff. The background audio beat or riff may be based on an input signal or set of input signals generated and sent by the video game controller. Generally, background audio samples are selected based on a set of strum and fret combination input signals received from the video game controller. In embodiments where riffs are primarily used as background audio tracks, background audio selection may occur while the video game controller is positioned in a tilt region associated with a riff mode. In some embodiments, the user may also be provided options for adjusting repeating or looping properties of the selected background audio. For example, particular input signals from the video game controller may be processed by the video game console, for example, for adjusting the number of times the background audio is repeated, or for example, for adjusting the volume of the established background audio. In some embodiments, methods of disabling a looping background audio sample may also be provided. Disabling an auto-looping background audio sample may involve, for example, the depression of predefined input devices on the video game controller, or for example, the initiation of a replacement background audio sample.

In block 1213, the process generates a note or chord over the selected background audio. In some embodiments, the notes or chords simulate real guitar sounds. The processor of the video game console selects and outputs audio notes and chords based on input signals received from the video game controller. In some embodiments, the video game controller is moved into a tilt region associated with a note mode or a power chord mode to generate notes over the background audio sample. In general, the background audio sample continues running while single notes or chords are output by the video game console.

In block 1215, the process determines whether to record the audio outputs. If the process determines to record or save the audio outputs, the process proceeds to block 1217. If instead the process determines not to record the audio outputs, the process proceeds to block 1219.

In block 1217, the process saves the input signals associated with the background audio sample, as well as the input signals associated with the generated note or chord played over the background audio sample. Both the background audio sample and a generated note or chord are established using input signals from the video game controller. Recording of the entire audio compilation therefore involves saving the information involved in establishing both the background audio and the generated note or chord. In typical embodiments, the information may include the fret combination mapped to the background audio sample, as well as the fret combination mapped to the note or chord output by the video game console. The process may thus be repeated to create a musical compilation including two or more audio tracks generated by a single user of the invention. In some embodiments the saved information may be uploaded to a server of a network, for example the Internet, and downloaded to other users for video game play or other enjoyment.

In block 1219, the process determines whether to exit music generation and recording. If the process determines to remain in music generation and recording, the process returns to block 1213, and generates a further note over the established background audio sample. If, instead, the process determines to exit music generation and recording, the process returns.

The invention therefore provides for a user directed sound generation feature in a music video game, with provided sound generation suggestions or recommendations. Although the invention has been described with respect to certain embodiments, it should be recognized that the invention may be practiced other than as specifically described, the invention comprising the claims and their insubstantial variations supported by this disclosure.

What is claimed is:

1. A method for generating audio samples in a music based video game, comprising:
    determining a tilt angle of the video game controller based on an angle of a neck of the video game controller with a stationary reference axis; and
    selecting a tilt region associated with a one of a plurality of predefined angle ranges into which the tilt angle falls; and
    determining status of a plurality of input devices of the video game controller;
    selecting an audio sample based on the tilt angle of the video game controller and the status of the plurality of input devices, with the audio sample being of a single note audio sample for a first tilt region of the plurality of tilt regions, a single chord audio sample for a second tilt region of the plurality of tilt regions, and a prerecorded sequence of audio samples for a third tilt region of the plurality of tilt regions; and
    commanding an output of the selected audio sample.

2. The method of claim 1, further comprising:
    determining a further status of the plurality of input devices;
    selecting a further audio sample based on the orientation of the video game controller and the further status; and
    commanding an output of the further audio sample.

3. The method of claim 1, wherein the video game controller includes a plurality of fret and inputs, and wherein the audio samples are associated with operation of the fret inputs.

4. The method of claim 3, wherein the video game controller further includes a strum input, and wherein an input signal includes status information of the fret inputs at a time the strum input is activated.

5. The method of claim 1, further comprising storing information of the angular position, the status, and a timing of the status.

6. The method of claim 1, wherein the audio sample based on the orientation and the status is modifiable by a user of the video game controller.

* * * * *